United States Patent
Drummond et al.

(10) Patent No.: US 7,555,461 B1
(45) Date of Patent: Jun. 30, 2009

(54) METHOD AND SYSTEM FOR CONNECTING SERVICES TO AN AUTOMATED TRANSACTION MACHINE

(75) Inventors: Jay Paul Drummond, Massillon, OH (US); Bob Cichon, Massillon, OH (US); Mark D. Smith, North Canton, OH (US); Dale Blackson, Canton, OH (US); David Weis, Ashland, OH (US); James Church, Kent, OH (US); Mikal R. Gilger, Wadsworth, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 09/913,701

(22) PCT Filed: Feb. 16, 2000

(86) PCT No.: PCT/US00/04130

§ 371 (c)(1), (2), (4) Date: Aug. 15, 2001

(87) PCT Pub. No.: WO00/49547

PCT Pub. Date: Aug. 24, 2000

Related U.S. Application Data

(60) Provisional application No. 60/120,506, filed on Feb. 17, 1999, provisional application No. 60/133,579, filed on May 11, 1999.

(51) Int. Cl.
*G06Q 40/00* (2006.01)
(52) U.S. Cl. .................. 705/40; 705/35; 902/8
(58) Field of Classification Search ............... 705/21, 705/39, 43, 40, 35; 235/379, 280, 420; 209/534; 709/203; 902/8
See application file for complete search history.

(56) References Cited

U.S. PATENT DOCUMENTS 4,075,460 A * 2/1978 Gorgens .................. 235/420

(Continued)

OTHER PUBLICATIONS

McGann, Michael, Portable ATM allows broad deployment. May 1997 Bank Systmes & Technology, vol. 34, No. 5, p. 1-2.*

(Continued)

*Primary Examiner*—James P Trammell
*Assistant Examiner*—Jamie H Swartz
(74) *Attorney, Agent, or Firm*—Ralph E. Jocke; Daniel D. Wasil; Walker & Jocke

(57) ABSTRACT

A system for connecting transaction services to an ATM (10, 500) that includes a network (20). A user interface service (12) and a lookup service (22) are in operative connection with the network. Transaction services such as a printer service (16), card reader service (18), and cash dispenser service (14) are also in operative connection with the network. These transaction services are operative to register with the lookup service and to upload a service proxy to the lookup service. The user interface service is operative to locate transaction services on the network by invoking a remote lookup method on the lookup service. The lookup service is operative to return service proxies that match the type of service that is required. The user interface service is further operative to invoke methods of the service proxies that remotely control the functionality of the transaction services on the network. The user interface service is further operative to register events with the service proxies for notification when certain events on the services occur.

17 Claims, 30 Drawing Sheets

U.S. PATENT DOCUMENTS

| | | | |
|---|---|---|---|
| 4,234,932 A * | 11/1980 | Gorgens | 235/379 |
| 4,621,326 A | 11/1986 | Rawlins | |
| 5,220,501 A * | 6/1993 | Lawlor et al. | 705/40 |
| 5,221,838 A | 6/1993 | Gutman et al. | |
| 5,265,033 A | 11/1993 | Vajk et al. | |
| 5,457,305 A | 10/1995 | Akel et al. | |
| 5,706,442 A | 1/1998 | Anderson et al. | |
| 5,893,106 A | 4/1999 | Brobst et al. | |
| 5,897,625 A * | 4/1999 | Gustin et al. | 705/43 |
| 5,912,818 A | 6/1999 | McGrady et al. | |
| 5,933,812 A | 8/1999 | Meyer et al. | |
| 5,933,816 A | 8/1999 | Zeanah et al. | |
| 5,937,396 A * | 8/1999 | Konya | 705/43 |
| 5,974,146 A | 10/1999 | Randle et al. | |
| 5,980,090 A | 11/1999 | Royal, Jr. et al. | |
| 6,005,942 A | 12/1999 | Chan et al. | |
| 6,012,048 A * | 1/2000 | Gustin et al. | 705/39 |
| 6,016,476 A * | 1/2000 | Maes et al. | 705/1 |
| 6,016,484 A | 1/2000 | Williams et al. | |
| 6,018,724 A | 1/2000 | Arent | |
| 6,019,284 A | 2/2000 | Freeman et al. | |
| 6,021,399 A | 2/2000 | Demers et al. | |
| 6,023,684 A | 2/2000 | Pearson | |
| 6,031,623 A | 2/2000 | Smith et al. | |
| 6,038,548 A | 3/2000 | Kamil | |
| 6,308,887 B1 * | 10/2001 | Korman et al. | 235/379 |
| 6,311,165 B1 * | 10/2001 | Coutts et al. | 705/21 |
| 6,314,451 B1 * | 11/2001 | Landsman et al. | 709/203 |
| 6,334,117 B1 * | 12/2001 | Covert et al. | 705/43 |
| 6,539,361 B1 * | 3/2003 | Richards et al. | 705/35 |
| 6,587,684 B1 * | 7/2003 | Hsu et al. | 455/419 |
| 6,687,737 B2 * | 2/2004 | Landsman et al. | 709/203 |
| 6,761,308 B1 * | 7/2004 | Hanna et al. | 235/379 |
| 6,880,123 B1 * | 4/2005 | Landsman et al. | 715/500.1 |
| 6,907,565 B1 * | 6/2005 | Huang | 715/513 |
| 6,945,457 B1 * | 9/2005 | Barcelou | 235/380 |
| 7,003,492 B1 * | 2/2006 | Usner et al. | 705/39 |
| 2001/0014881 A1 * | 8/2001 | Drummond et al. | 705/43 |
| 2002/0011431 A1 * | 1/2002 | Graef et al. | 209/534 |

OTHER PUBLICATIONS

Dave, Sefika, and Cambell. Proxies, Application Interfaces, and Distributed Systems, 1992 IEEE p. 212-220.*

Dave, Sefika, and Cambell. Proxies, Application Interfaces, and Distributed Systems, 1992 IEEE p. 212-220.*

McGann, Michael, Portable ATM allows broad deployment. May 1997 Bank Systmes & Technology, vol. 34, No. 5, p. 1-2.*

McGann, Michael, Portable ATM allows broad deployment. May 1997 Bank Systmes & Technology, vol. 34, No. 5, p. 1-2.*

Dave, Sefika, and Cambell. Proxies, Application Interfaces, and Distributed Systems, 1992 IEEE p. 212-220.*

"Phoenix Demonstrates Enhanced Remote System Management with Sun's JINI Technology", Phoenix Technologies Web Page, Jan. 25, 1999.

"It's Out of the Bottle—Sun Introducts JINI Connection Technology, Enabling the Simple Connection of Any Device to Any Network, Any Time, Anywhere", Sun Microsystems Press Release. Sun Microsystem Web Site, Jan. 25, 1999.

Shimbun Yomiuri, "Report from Silicon Valley; Sun's JINI may be out of the bottle", Daily Yomiuri, Dec. 22, 1998.

David Clark, "Network Nirvana and the Intelligent Device", IEEE Concurrency, Apr.-Jun. 1999, pp. 16-19.

* cited by examiner

980

| 982 | 984 | 986 Edit Accounts Menu | 988 | 990 | 912 |
|---|---|---|---|---|---|
| Name | Type | Password/Pin | Account Number | EXP | Issuer ID |
| Bank A Visa Account | Charge | **** | 123-456-792 | 1/1/2004 | 11111111 |
| Bank B Checking Account | Checking | **** | 123-456-791 | 1/1/2004 | 11111112 |
| Bank C Savings Account | Savings | **** | 123-456-790 | 1/1/2004 | 11111113 |
| Bank D Debit Card | Checking | **** | 123-456-789 | 1/1/2004 | 11111114 |
| Money Market | Financial | **** | 123-456-788 | 1/1/2004 | 11111115 |
| Gas Card | Charge | **** | 123-456-787 | 1/1/2004 | 11111116 |
| Insurance Account | Insurance | **** | 123-456-786 | 1/1/2004 | 11111117 |
| Docters Perscription | Medical | **** | 123-456-785 | 1/1/2004 | 11111118 |
| Local e-money storage | encrypted | **** | 123-456-784 | 1/1/2004 | 11111119 |
| Electricity | payment | **** | 123-456-783 | 1/1/2004 | 11111120 |
| Telephone | payment | **** | 123-456-782 | 1/1/2004 | 11111121 |
| Mortgage | payment | **** | 123-456-781 | 1/1/2004 | 11111122 |
| Car Loan | payment | **** | 123-456-780 | 1/1/2004 | 11111123 |

Add   Edit   Delete

FIG. 32

METHOD AND SYSTEM FOR CONNECTING SERVICES TO AN AUTOMATED TRANSACTION MACHINE

This application is a national stage of International Application No. PCT/US00/04130 filed Feb. 16, 2000, which claims the benefit of U.S. Provisional Application Nos. 60/120,506 filed Feb. 17, 1999 and 60/133,579 filed May 11, 1999.

Method and system for connecting services to an automated transaction machine.

TECHNICAL FIELD

This invention relates to the connection of devices in automated transaction machines. Specifically this invention relates to a new method and system for connecting transaction services in automated transaction machines.

BACKGROUND ART

Automated transaction machines are known in the prior art. Automated transaction machines are used to electronically carry out transfers representative of value. Automated transaction machines include for example, cash dispensers, ticket dispensers, scrip dispensers, gaming machines, Automated Teller Machines (ATMs) and other self service terminals. For purposes of convenience all such automated transaction machines will be referred to herein as ATMs unless otherwise specifically indicated.

ATMs may include various types of transaction function devices. These devices are operated to carry out transactions. Different types of ATMs include different types of devices. The different types of devices enable the ATM to carry out different types of transactions. For example, some types of ATMs include a depository for accepting deposits while other ATMs do not. Some ATMs have a "touch screen" while others have separate displays and input buttons. ATMs can also be fitted with devices such as cash and coin acceptors, statement printers, check validators, bill acceptors, thumb print readers and other types of devices, while other ATMs do not include such devices. ATMs also continue to incorporate improved or additional features. For example, printers are improved from black to color inks; cash acceptors are improved to work with both old and new styles of a twenty-dollar bill; and card readers are improved so they can work with magnetic stripe cards and smart cards.

As long as the basic functionality of a new device is the same as a device it replaces, the software code or drivers needed to communicate with the new device may also remain generally the same. Thus for example the application software for an ATM with a cash dispenser can issue a command to dispense cash as it has always done even after the cash dispenser is improved.

However, if the new device is so substantially changed relative to a device that it replaces so that it requires an updated driver, a service technician will be required to install a new device driver with the new device. As long as the new driver is backward compatible with the older driver, the ATM will continue to function generally as before.

Unfortunately installing new drivers can require more time than installing a new physical transaction function device in the ATM. Normally new drivers are installed from a floppy disk, CD ROM or other portable storage medium. A technician is required to access the computer that runs the ATM, and must replace the physical files of the old drivers with the new drivers. Even when user friendly setup programs or wizards are used to make this process easier, it requires a degree of specialized knowledge and expertise to update the ATM software driver correctly.

For example, a single type of device may have a different driver for each model and version that has been manufactured. Keeping track of the correct drivers and verifying that the correct driver is installed for a device, is a tedious endeavor. Furthermore it may not be obvious when a driver for "Model A" of a device is incorrectly used for "Model B". Although 99% of the functionality of the device may work properly, an ATM with an incorrect driver may experience intermittent problems related to that 1% of incompatibility with the driver.

Tracking down these incompatibilities can consume a large amount of a technician's time. Consequently it would be desirable to streamline the updating of drivers to reduce the amount of time it takes to update a device and to reduce the chances of installing the incorrect driver for a new device.

A typical ATM application program not only communicates through an interactive user interface with input and output devices, but also controls the overall functionality of the devices in an ATM. Prior art ATMs generally require that the ATM be shut down when a new or additional device is installed. Prior art systems assume that individual devices that are configured for use in the ATM will remain available while the ATM is operating. However, if a device is disabled, prior art ATMs may not notice that the device is disabled until the ATM attempts to use the device, at which time an error is generated. Such an error usually results in the entire ATM or system being disabled until the device is reenabled or the ATM is manually reconfigured to know that the device is no longer available.

Consequently, changes to the configuration of an ATM require disabling the ATM for a period of time to remove, replace or add a device. This process can be time consuming and may result in lost business at the ATM. Consequently it would be desirable for an ATM to have the ability to detect when devices are present or not present and to automatically change configuration while continuing to operate.

Often functions of a device in an ATM are directly controlled responsive to inputs to a user interface. Individual devices often do not control the functionality of other devices. For example, when an ATM application program needs to lock or unlock a device which contains envelopes and also needs to enable a device which accepts deposit envelopes, the application must issue commands to both devices. This is the case even though both devices are related and are designed to operate at proximate times. Individual ATM transaction devices often do not communicate with each other. For example, a device for receiving deposit envelopes does not issue a command to the envelope holder to close the door to the holder when the deposit function is completed. The application program must generally include all the programming logic for coordinating the operation of multiple devices. The additional code required makes the application program more complex and more difficult to modify. Consequently it would be desirable for ATM devices to communicate directly with each other to facilitate the performance of coordinated activities by transaction function devices.

Prior art device drivers for devices in an ATM are often composed of low level functions for controlling the hardware. Programmers who create ATM software are generally required to have a high degree of knowledge about how a hardware device and device drivers are designed to work before the device can be incorporated into an ATM. This low level complexity often makes ATM application programs more complex and difficult to produce and reconfigure. Consequently it would be desirable to increase the efficiency of programmers who develop ATM software and to make device drivers easier for programmers to integrate into an ATM program without requiring the programmer to have an in-depth understanding of the low level hardware.

Many types of ATMs include an internal device bus to which transaction devices are attached. This device bus facilitates the communication between the application program and the individual devices. Such device buses are often proprietary and are designed to connect directly with the computer that controls the operation of the ATM. Such device buses limit the number of devices that can be attached to an ATM and limit the physical locations at which devices can be attached. Consequently, it would be desirable to have an ATM with a system for attaching devices that is not limited to the physical constraints of an internal bus.

DISCLOSURE OF INVENTION

It is an object of an exemplary form of the present invention to provide an ATM in which transaction devices may be more easily connected.

It is an object of an exemplary form of the present invention to provide an ATM in which the amount of time it takes to add a transaction function device to the ATM is reduced.

It is a further object of an exemplary form of the present invention to provide an ATM in which the possibility of installing a wrong driver for a device in the ATM is reduced.

It is a further object of an exemplary form of the present invention to provide an ATM in which it is easier to install device drivers in the ATM.

It is a further object of an exemplary form of the present invention to provide an ATM in which device drivers are easier to incorporate into ATM programs.

It is a further object of an exemplary form of the present invention to provide an ATM in which transaction devices have properties of object-oriented services in the ATM.

It is a further object of an exemplary form of the present invention to run an ATM which includes services that encapsulate the low-level hardware functionality of a device and to present only high-level object oriented methods and events for controlling the device.

It is a further object of an exemplary form of the present invention to provide an ATM which includes an application program and other software components in the ATM which include properties of an object-oriented service.

It is a further object of an exemplary form of the present invention to provide an ATM which includes a transaction service which operates to automatically install its own drivers when the service is installed in the ATM.

It is a further object of an exemplary form of the present invention to provide an ATM in which services directly communicate with other services in the ATM.

It is a further object of an exemplary form of the present invention to provide an ATM in which services control the functionality of other services in the ATM.

It is a further object of an exemplary form of the present invention to provide an ATM in which services may be dynamically added and removed without disabling the entire ATM.

It is a further object of an exemplary form of the present invention to provide an ATM in which many services are attached.

It is a further object of an exemplary form of the present invention to provide an ATM in which a service may be attached to the ATM at a great distance from the main housing of the ATM.

It is a further object of an exemplary form of the present invention to provide an ATM in which services are connected to the ATM through a network.

It is a further object of an exemplary form of the present invention to provide an ATM in which services are connected to the ATM with different types of network typographies and protocols.

It is a further object of an exemplary form of the present invention to provide an ATM in which services issue events remotely across a network when there is a change in the state of the service in the ATM.

It is a further object of an exemplary form of the present invention to provide an ATM in which services invoke method calls remotely across a network to control other services in the ATM.

It is a further object of an exemplary form of the present invention to provide an ATM which uses a service proxy to enable a service to communicate with another service in the ATM.

It is a further object of an exemplary form of the present invention to provide an ATM which passes service proxies across a network between different services and programs in the ATM.

It is a further object of an exemplary form of the present invention to provide an ATM which operates to store service proxies in a central repository located on a network in the ATM.

It is a further object of an exemplary form of the present invention to provide an ATM which services can look up the required service proxy by querying the central repository of proxies on the network in the ATM.

It is a further object of an exemplary form of the present invention to provide an ATM server that can coordinate the functionality of a plurality of network ATM workstation services.

It is a further object of an exemplary form of the present invention to provide an ATM that can quickly connect and disconnect with services.

It is a further object of an exemplary form of the present invention to provide an ATM that can quickly connect and disconnect with other ATMs.

It is a further object of an exemplary form of the present invention to provide a personal ATM that is personal to a user.

It is a further object of an exemplary form of the present invention to provide a personal ATM that is operative to store information for a plurality of personal accounts belonging to a user.

It is a further object of an exemplary form of the present invention to provide a personal ATM that is operative to coordinate with another ATM to withdraw money.

It is a further object of an exemplary form of the present invention to provide a personal ATM that is operative to coordinate with another ATM to deposit checks.

It is a further object of an exemplary form of the present invention to provide a personal ATM that is operative to coordinate with another ATM to transfer value between personal accounts.

It is a further object of an exemplary form of the present invention to provide a personal ATM that is operative to pay for the dispense of items at a dispenser.

It is a further object of an exemplary form of the present invention to provide a personal ATM that is operative to coordinate with a point of sale terminal to transfer value.

It is a further object of an exemplary form of the present invention to provide an ATM that is operative to upload a user interface application to another computer system for interfacing with the ATM.

It is a further object of an exemplary form of the present invention to provide a personal ATM that is operative as a service to allow software applications to interface with the personal ATM to perform transactions.

It is a further object of an exemplary form of the present invention to provide a Personal Digital Assistant operated as a personal ATM.

It is a further object of an exemplary form of the present invention to provide a cell phone operated as a personal ATM.

It is a further object of an exemplary form of the present invention to provide a smart card operated as a personal ATM.

It is a further object of an exemplary form of the present invention to provide a host ATM that is operative to interface with a personal ATM.

It is a further object of an exemplary form of the present invention to provide a host dispenser that is operative to interface with a personal ATM.

It is a further object of an exemplary form of the present invention to provide a point of sale device that is operative to interface with a personal ATM.

Further objects of exemplary forms of the present invention will be made apparent in the following Best Modes For Carrying Out Invention and the appended claims.

The foregoing objects are accomplished in one exemplary embodiment of the invention by an ATM that includes a network for attaching devices. This network serves as a communication link between the ATM application software operative in the main computer system of the ATM and the transaction function devices that comprise functional elements in the ATM. Examples of such transaction function devices include cash dispensers, cash acceptors, card readers, depositories, and printers. However, embodiments of the present invention may encompass a new form of these transaction function devices called transaction services. Transaction services have properties of objects, similar to objects in object oriented programming languages such as C++ or Java®. Transaction services such as a print service, accept method calls remotely across the network for performing such functions as printing text or delivering a printed receipt. In addition, services can issue events remotely in other services. For example, a printer service can invoke an event in an application program when the printer service is out of paper. ATM application programs can also include elements of an object oriented service. In this way all components whether hardware or software have properties of objects that adhere to the same set of protocols. Thus the exemplary embodiment of the present invention is an ATM that is created by assembling service objects.

In the exemplary embodiment Sun Microsystems JINI™ defines the low level protocols used to configure transaction services on an ATM network. However, the present invention also encompasses other protocols such as Microsoft Universal Plug and Play™ that are operative to allow services in an ATM to automatically configure themselves on an ATM network and to communicate with each other with object method calls and events.

In an exemplary embodiment of the present invention, services include a computer processing unit and memory for running a Java® Virtual Machine (JVM). In addition services include a nonvolatile data store such as a disk or NVRAM for storing hardware-independent Java® software proxy objects. These Java® proxy objects replace prior art hardware-specific device drivers for controlling the physical hardware.

Prior art ATMs have an application software program that operates to cause the display of a graphical user interface, that receives inputs from input devices such as keypads and that controls the operation of the transaction devices such as a sheet dispenser. In the exemplary form of the present invention the application is itself a service. It interacts with other services such as a card reader service based on the JINI™ protocols. The application service is operative to acquire one or more service proxy objects for each service that must be controlled by the application. These service proxies originate from the individual services themselves and are used by the application service to remotely control services across the network. In this manner each service contains all the software necessary to control its underlying hardware functions. No longer is there a need for a service technician to install the correct drivers on the main computer of an ATM. Instead the correct service proxies are automatically updated from the service itself.

Upon connecting a new transaction service to a network in an ATM, the service is operative to locate a special service on the ATM's network called a lookup service. This lookup service is responsible for registering each service on the network and storing a copy of each services' service proxy. This process of registering a new service on the ATM network is defined by "discover" and "join" protocols. After registration, other programs or services that need to communicate with or control the functionality of a particular type of transaction service, contact the lookup service and download the appropriate service proxy. The service proxy in the exemplary embodiment is a Java® object that is run in the JVM of the calling service. This service proxy defines the methods and events necessary to communicate with a service across the network.

Because each service contains its own service proxy, when an old transaction service such as a cash dispenser is replaced with a new model, the service proxy for the new model is automatically installed and integrated in the ATM system. Consequently, the amount of time needed to update an ATM with newer services and the chances of installing incorrect drivers are reduced.

Because the transaction services each contain their own individual JVM, they are also operative to load the service proxies of other services which will enable them to communicate and control other services directly. This feature is useful for services that are designed to work in tandem. For example, in prior art ATMs the application program controls each device. However devices do not control the application program. In the exemplary embodiment of the present invention the application is a service. As such it has service proxies for each transaction service it has control over, such as a card reader service. However, because the application is also a service, the card reader may upload a proxy for the application that allows card reader to issue methods for controlling the application.

For example, when a debit or credit card is first inserted into a card reader, the card reader can issue an application method using the application proxy to awaken the application service and pass attributes representative of the numbers encoded on the card. Such service to service communication is more efficient and easier to program than having the application constantly monitor the card reader for card insertions as in prior art ATMs.

It is to be understood that services can be created that do not have the processing ability to run a JVM. For such services the protocols for configuring the service on the network may be programmed directly into the firmware of the service.

Another advantage of placing services on a network, is that services can be attached to an ATM at greater distances. For example, rather than placing all the transaction services inside a single ATM enclosure, multiple groups of services can be configured on the same network. For example a bank could have one large private or virtual private network with multiple sets of ATM services located throughout a city. Each of the groups of services represents a single ATM workstation with an application service and multiple other transaction services. A special host service on the network could route banking transaction messages between the multiple ATM workstations and an external host network.

An advantage of this system, compared to the prior art is that each service is an individually networked component, that can be easily replaced and updated dynamically. Further, each component of the ATM can be remotely monitored, taken off line to troubleshoot without interfering with other services in an ATM or other ATMs on the network.

Such dynamic connections have the advantage of allowing ATMs to connect to different types of services when needed. These on the fly connections make possible an alternative embodiment of the Jini enabled ATM in which the ATM is personal to an individual. This personal ATM can reside on any small portable computing device such as a notebook computer, cell phone, PDA, pager, or smart card. The personal nature of this embodiment allows an individual to store a plurality of their personal banking account information in a data store of the personal ATM. This alleviates the need to insert a banking card into the personal ATM to activate it. Instead, the personal ATM is inoperative until the personal password or other unique input of the owner of the personal ATM is entered and validated.

When a user of the personal ATM desires to perform banking transactions, the user can connect the personal ATM to a network that offers the desired services. For example, if a user wishes to dispense cash, the personal ATM can be placed in operative connection with a Jini enabled host ATM that includes a cash dispenser service. The personal ATM can discover and join with the host ATM and use a proxy to the cash dispenser service to dispense cash. The personal ATM may be operative to prompt the user to select an account from which to receive the money and the amount desired. The information associated with the selected account and the amount desired are sent to the cash dispenser service with method calls of the cash dispenser proxy. After validating the account information, the cash dispenser will dispense the cash and have the selected account debited.

Such a personal ATM can dynamically connect with banking services of a host ATM to deposit cash or checks and to transfer value between accounts. In addition, the personal ATM can connect to other types of devices that accept value as payment. For example, the personal ATM could connect with a Point of Sale (POS) service to transfer account information for payment of a bill. The personal ATM may connect with a Jini enabled dispenser service to pay for the dispense of items such as medication, snack foods, or any other item that dispensers and vending machines have to offer. The personal ATM of the present invention is operative to dynamically connect with any additional Jini service for transferring value from or to the service.

BRIEF DESCRIPTION OF DRAWINGS

FIG. 32 schematically represents the personal ATM interface menu for editing account information stored in the data store of the personal ATM.

BEST MODES FOR CARRYING OUT INVENTION

Figure 1:
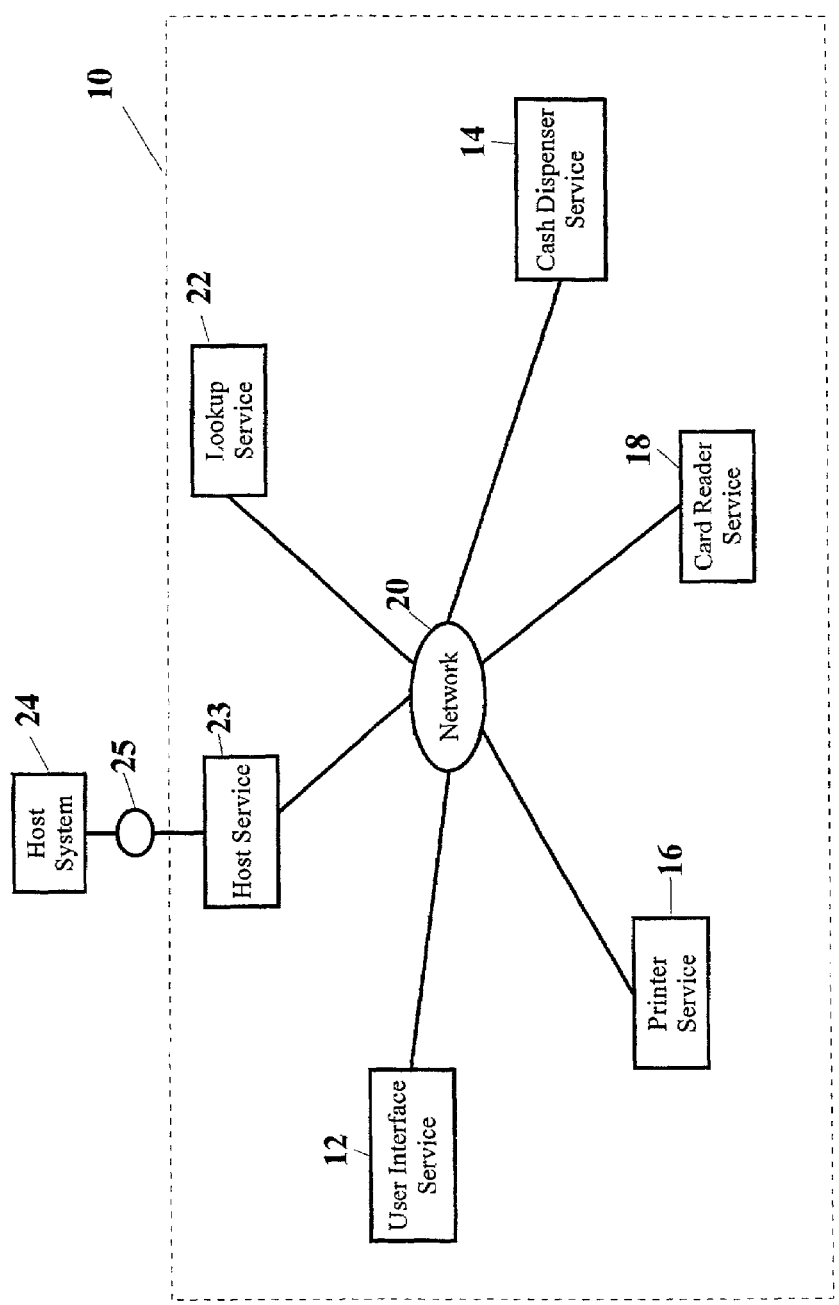
FIG. 1 is a schematic view of a first exemplary embodiment of an ATM system of the present invention.

Referring now to the drawings and particularly to FIG. 1, there is shown therein, a schematic view of an ATM 10 that includes a number of transaction services, including an application 12 which is referred to herein as a user interface service. The exemplary ATM further includes a cash dispenser service 14, a print service 16, and a card reader service 18. Each of these services is connected to a common network 20. The ATM also includes a lookup service 22 that is responsible for registering new services on the network and providing a repository of service proxies of the services connected to the network.

The ATM also includes a host service 23 that is operative to pass transaction messages between the ATM and an external network 25. Network 25 is connected to at least one host system 24 and preferably a plurality of host systems used in connection with banking systems or clearinghouses. Host system 24 is typically responsible for transaction processing related to such tasks as validating a user's card and PIN numbers, debiting a withdrawal of money from a checking account and other transactions.

Figure 2:
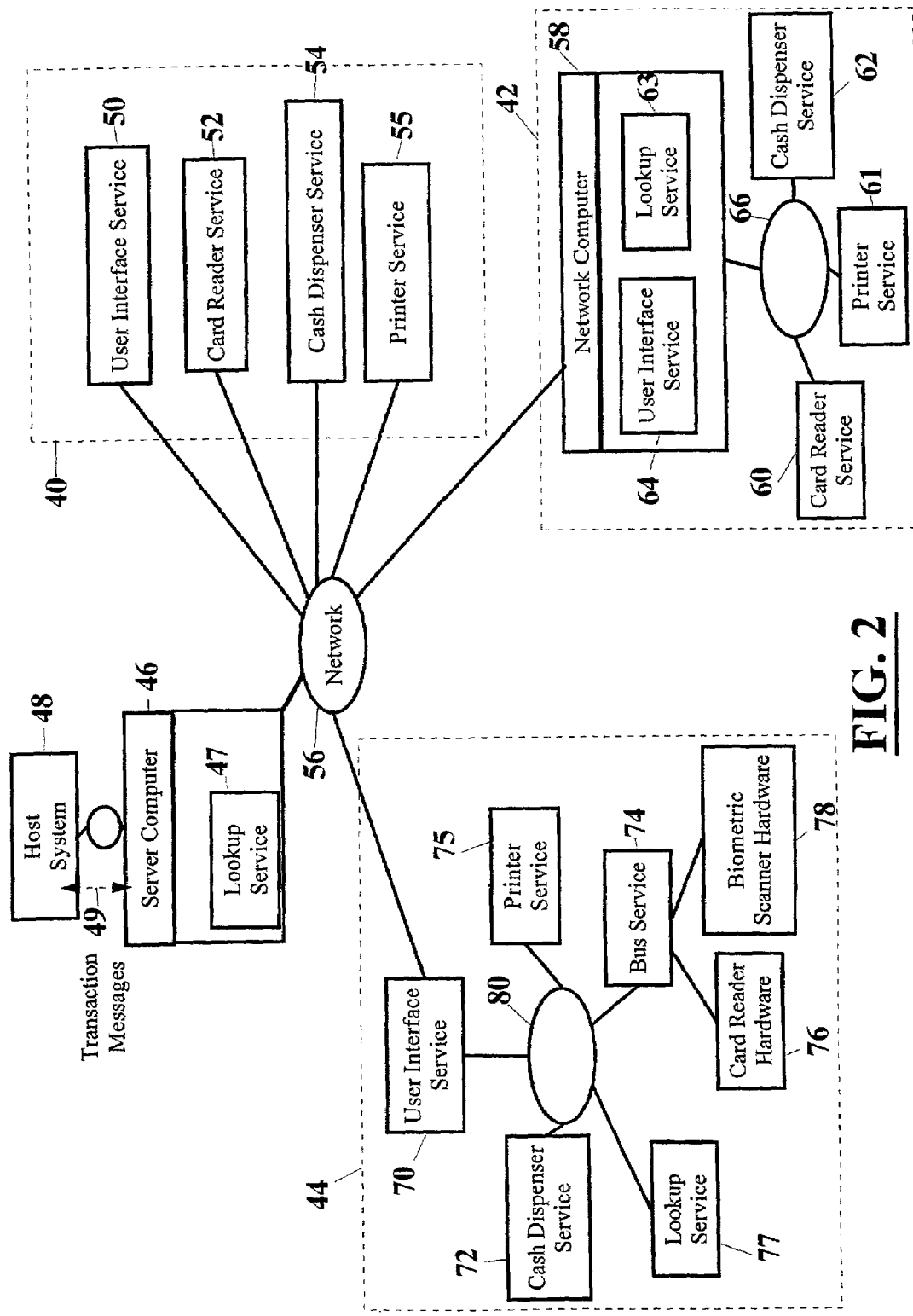
FIG. 2 is a schematic view of a further exemplary embodiment of an ATM system of the present invention.

Each service is operative to communicate with each of the other services through the network 20. One advantage of using a network to connect services in an ATM is that services are no longer limited to being connected to a proprietary ATM communication bus. FIG. 2 shows an exemplary embodiment of an ATM system with multiple groups of services in ATMs 40, 42, and 44 connected to a common network 56. Each of these ATM services groups has the ability to communicate with a server computer 46 that is responsible for sending transaction messages 49 to an external host system 48 on behalf of each ATM services group. In this embodiment a lookup service 47 operates to register each ATM services group and includes a program that resides on the server computer. However, in alternative embodiments the lookup service may be an independent service attached to the network. In other embodiments each group of services in an ATM could have its own lookup service.

ATM 40 is an exemplary embodiment of the invention in which services 50, 52, 54, and 55 are independently connected to the network 56. In the exemplary embodiment the network may be an Ethernet network using TCP/IP protocol. Each service has its own IP address. The IP address for example could be automatically assigned or obtained from DHCP server. Each of the services in the group which is included in ATM 40 registers with the lookup service 47 and communicates through the network 56.

ATM 42 is an exemplary embodiment in which only a network computer 58 is physically connected to the network 56. Examples of a computer that may be used in this embodiment, include an Intel® based PC, a proprietary computer, a dedicated Java® workstation, or any other type of machine that is capable of connecting to a network, and running a JVM. The user interface service 64 and a local lookup service 63, are preferably Java® programs that run on the JVM of the network computer 58. However, such services and related service proxies can be generated from other languages and programming tools as long as the generated byte code executes in a JVM. Of course in other embodiments other types of virtual machines may be used.

Transaction services such as a card reader service 60, print service 61, and a cash dispenser service 62 are connected to a network 66 that is local to the network computer 58. This local network 66 could be based network topologies such as Universal Serial Bus (USB), Firewire IEEE 1394 or any type of connection that allows devices to communicate with each other. A local lookup service 63 is responsible for registering local services attached to the local network 66.

ATM 44 is an exemplary embodiment where only a user interface service 70 is in operative connection with the network 56. Transaction services such as a cash dispenser 72, a lookup service 77, and a printer service 75 are connected to a local network 80. Here however, some of the transaction devices such as a card reader 76 and a biometric scanner 78 are older legacy devices that do not have the characteristics of a transaction service.

To accommodate these legacy devices in ATM 44, this embodiment includes a special bus service 74 which acts as a router between other services on the local network 80 and the legacy devices 76 and 78. The bus service 74 is operative in a manner similar to other services on the network, however, instead of having a single hardware function, it controls multiple hardware devices. From the point of view of other services, such as the user interface service, each of the legacy devices appears to be an independent service object. The bus service is responsible for translating and routing the service communication into the specific hardware signals needed to operate the legacy devices.

Figure 3:
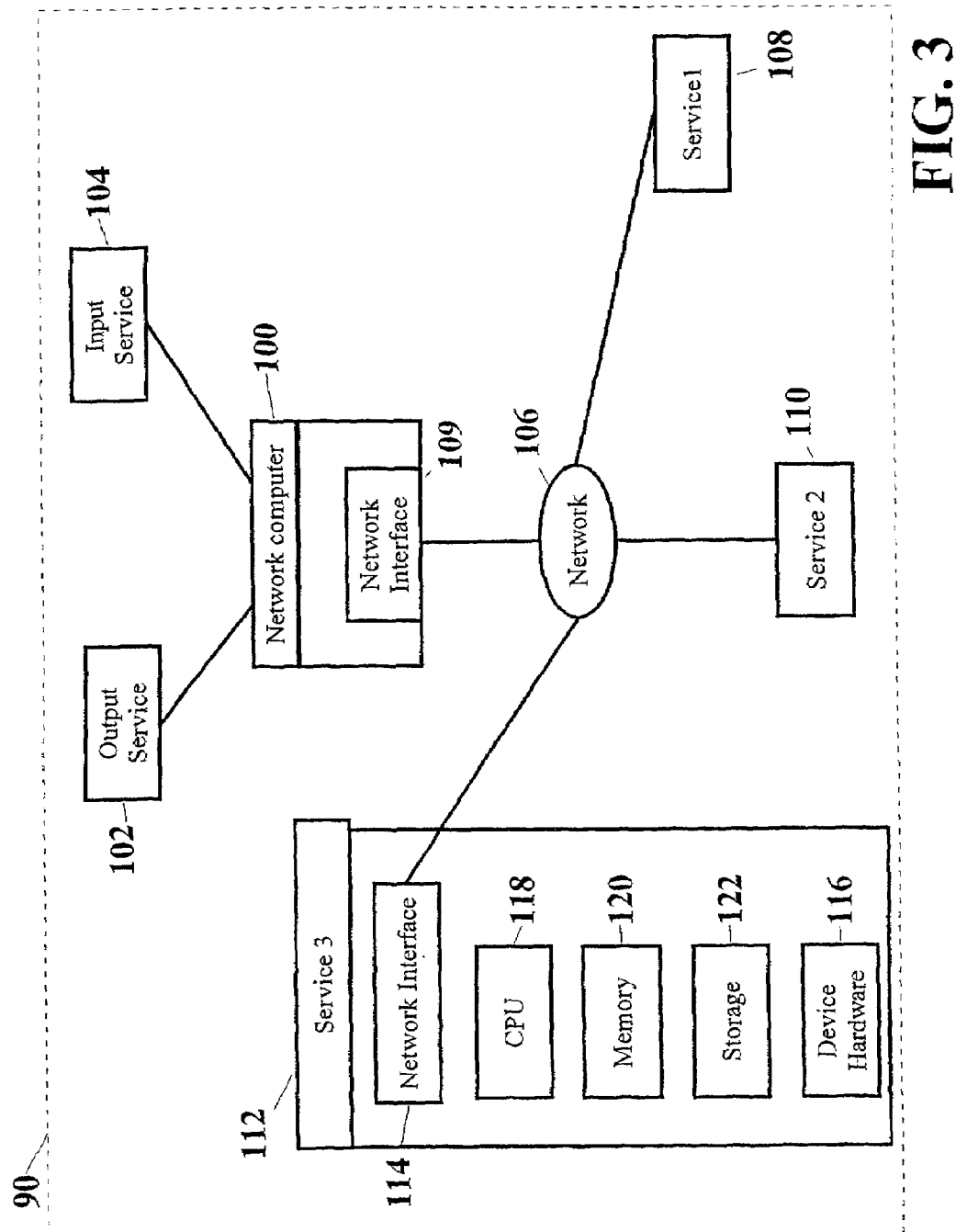
FIG. 3 is a schematic view of a further exemplary embodiment of an ATM system of the present invention.

FIG. 3 is a schematic exemplary view of an ATM 90 with networked transaction services 108, 110, and 112. The system includes a network computer 100. The network computer is operative to execute a user interface service. The user interface service is operative to cause the display of a user interface output on an output service 102 such as a computer screen, and which accepts inputs from an input service 104 which includes a keypad, touch screen component or other input device. The network computer also includes a network interface 109 for connecting to the common network 106 of the ATM. As discussed above this network 106 does not necessarily have to include an Ethernet type network. The present invention is not limited to any particular type of network for connecting services. Hence the network could be based on such architectures as the Universal Serial Bus (USB) or Firewire IEEE-1394.

In the exemplary embodiment each transaction service also conforms to the JINI™ specification. Each service includes a processor such as CPU 118 and a memory 120 for running Java® programs in a JVM. Exemplary service 112 includes a network interface 114 for connecting to the network 106. The service also includes storage such as a disk, NVRAM 122 or other type of data store. The storage 122 is used to hold Java® objects and proxies which facilitate communication with other services on the network. The processor operates responsive to the stored programs.

Figure 4:
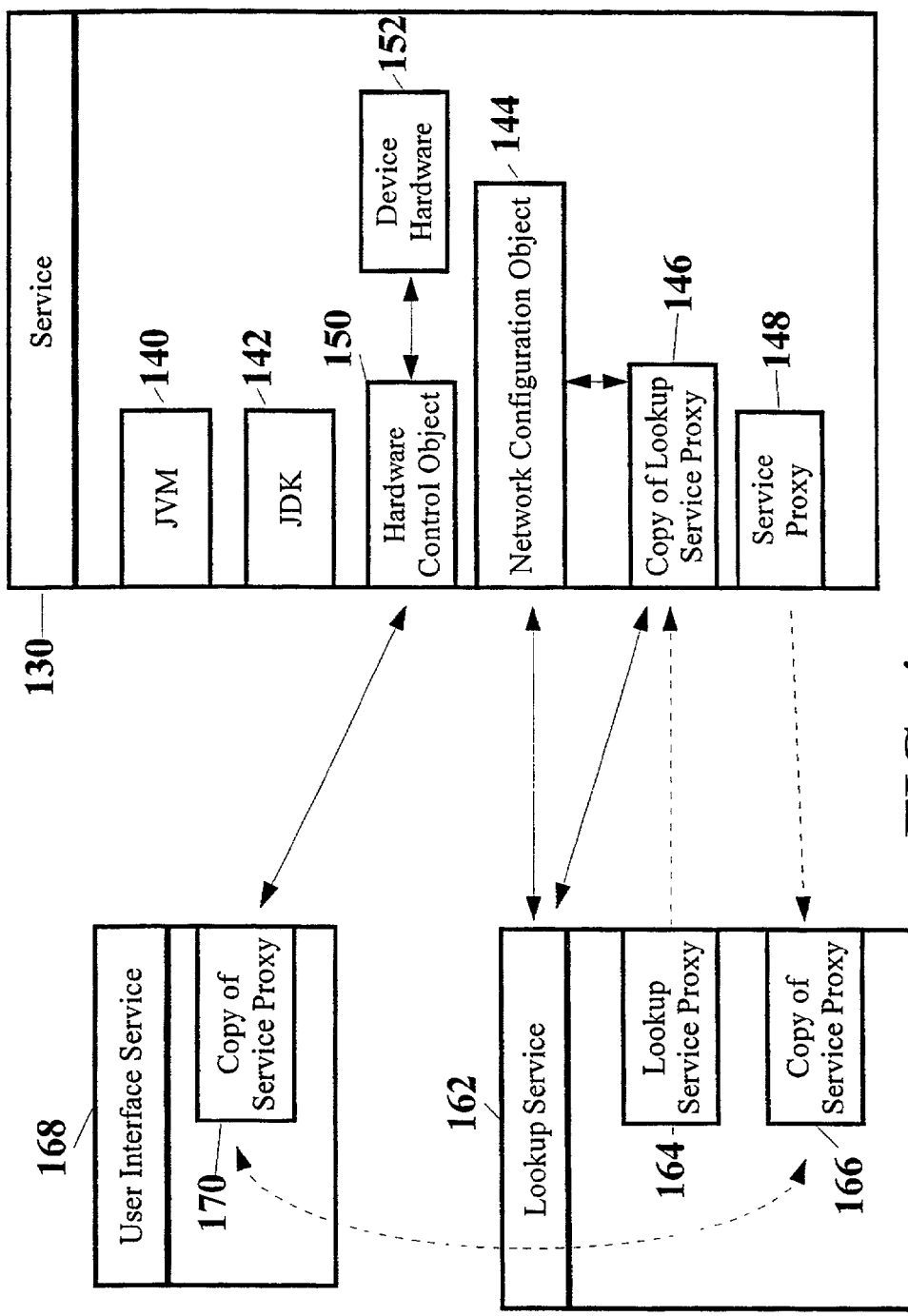
FIG. 4 is a schematic representation of software components included in an exemplary service.

The software components that are included with each service are schematically represented for the exemplary embodiment in FIG. 4. An exemplary service 130 used in connection with the present invention includes a JVM 140 which is operative to run programs written with Java® Development Kit® (JDK) Classes 142. Because transaction services typically perform a narrowly defined hardware function, a large portion of the JDK 142 does not need to be included with each service. JDK classes for building a graphical user interface are not needed in services such as a cash dispenser. Thus the JDK can be reduced in size to reduce the storage requirements of the service.

The service 130 also includes a network configuration object 144 which in the exemplary embodiment conforms to the JINI™ registration specifications for "discovering" and "joining" with the network. As part of this discovery process the service 130 downloads a lookup service proxy 164 from a lookup service 162 which is located on the network with other transaction services that comprise the ATM. A copy of this lookup service proxy 146 is stored with the service 130 and is used by the service to join the ATM network.

During registration with the lookup service 162, the service 130 will upload a copy 166 of a service proxy 148 stored in association with service 130, to the lookup service 162. In the exemplary embodiment this service proxy 148 is a Java® object that enables other services or programs such as a user interface service 168 to remotely invoke methods of the service 130 across a network.

The service 130 may also include other software components such as a hardware control object 150 that includes methods for controlling the underlying hardware device functions 152 of the service 130. In the exemplary embodiment a service such as the user interface service 168 causes its associated processor to operate to acquire the copy 170 of the service proxy 166 from the lookup service which serves as a repository for such proxies, and invokes methods of the copy of the service proxy 170 to have the hardware control object 150 operate the device hardware functions 152 of the service.

Although the exemplary embodiment uses Java® objects running inside a JVM on each service, an alternate form of the service can be created that does not have a JVM. Such a service however, may have the instructions for interacting with a network that are hard coded into the firmware of the service. This approach may be appropriate for an inexpensive service that cannot justify the added expense of a dedicated CPU and memory. Unfortunately, the hard coding of methods for registration and security into firmware may limit the ability of the lookup service to evolve. Hence, such services may be designed to include a process for updating the firmware. Also future versions of the lookup service may maintain the same methods for registration and security so as to be able to continue to communicate with these hard coded services.

JVM enabled services do not have this limitation, because they can download an updated lookup service proxy during the discovery stage. Also JVM enabled services also have the ability to download and invoke the methods of service proxies for new or different type services.

Figure 5:
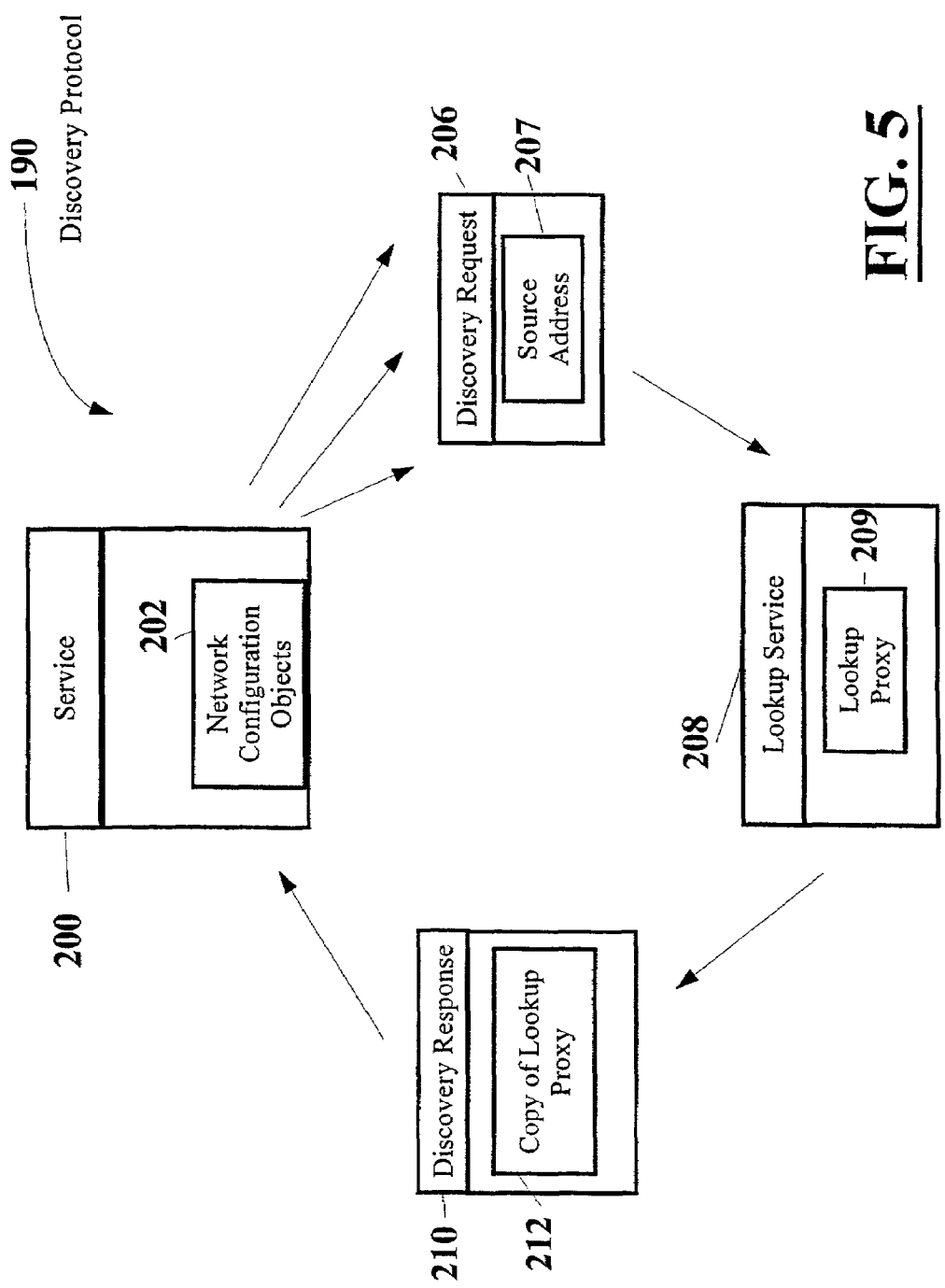
FIGS. 5-8 schematically represent protocols for registering transaction services on an ATM network.

FIGS. 5-8 schematically show exemplary protocols for registering transaction services on an ATM network, and communicating with services. FIG. 5 shows an exemplary embodiment of a "discovery" protocol 190. Here a service 200 has been newly connected to a network. The service has network configuration objects 202 that are operative to send a discovery request message 206 out on the network. This request 206 is preferably multicasted to all lookup services that might be present (in TCP/IP environments the network protocol used maybe multicast UDP). In alternate environments, services may be operative to unicast a request to a specific lookup service using its known IP or URL address.

The request 206 includes a source address 207 such as the IP address of the service 200. Each lookup service 208 on the network is operative to respond to the request message with a discovery response 210. Because the source address 207 of the service 200 is known, the discovery response 210 is not multicasted to all services, but is unicast directly to the service initiating the discovery.

The response 210 includes a copy 212 of the lookup service proxy 209 for remotely invoking methods of the lookup service 208. In the exemplary embodiment the lookup service proxy is a Java® class with methods for: registering with the network; negotiating leases for the amount of time the service can be connected to the ATM network; and for looking up other services on the network based on a search criteria.

Figure 6:
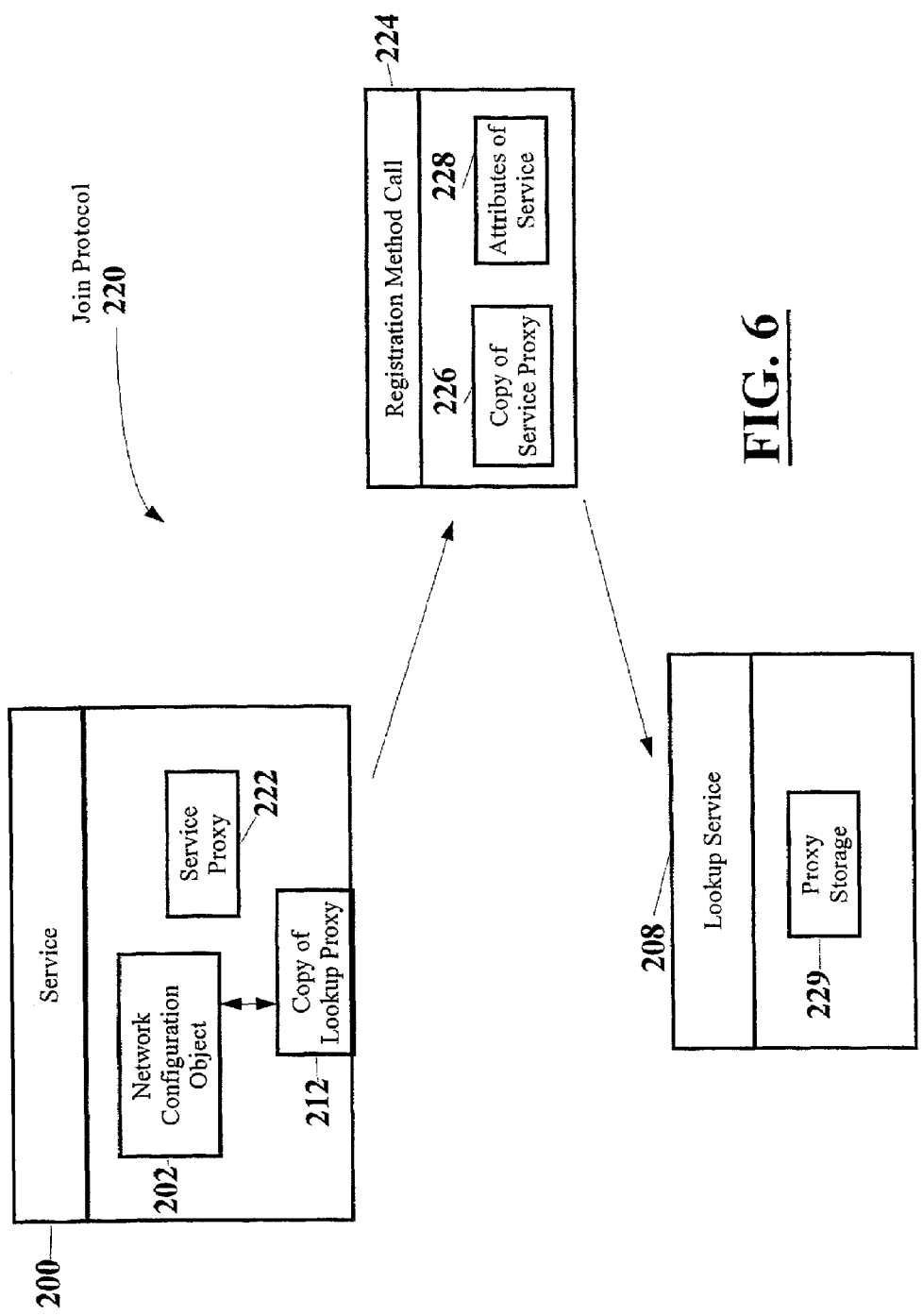

FIG. 6 schematically represents a "join" protocol 220. Here the network configuration objects 202 of the service 200 invoke a registration method of the lookup proxy 212. This method is operative to send registration data 224 that includes a copy 226 of a service proxy 222 and specific attributes 228 of the service to the lookup service 208. These attributes define the characteristic of the particular type of service. For example if the service is a printer, the attributes may specify that the printer is a color printer. The lookup service 208 preferably stores all uploaded service proxies in a proxy storage area 229.

Figure 7:
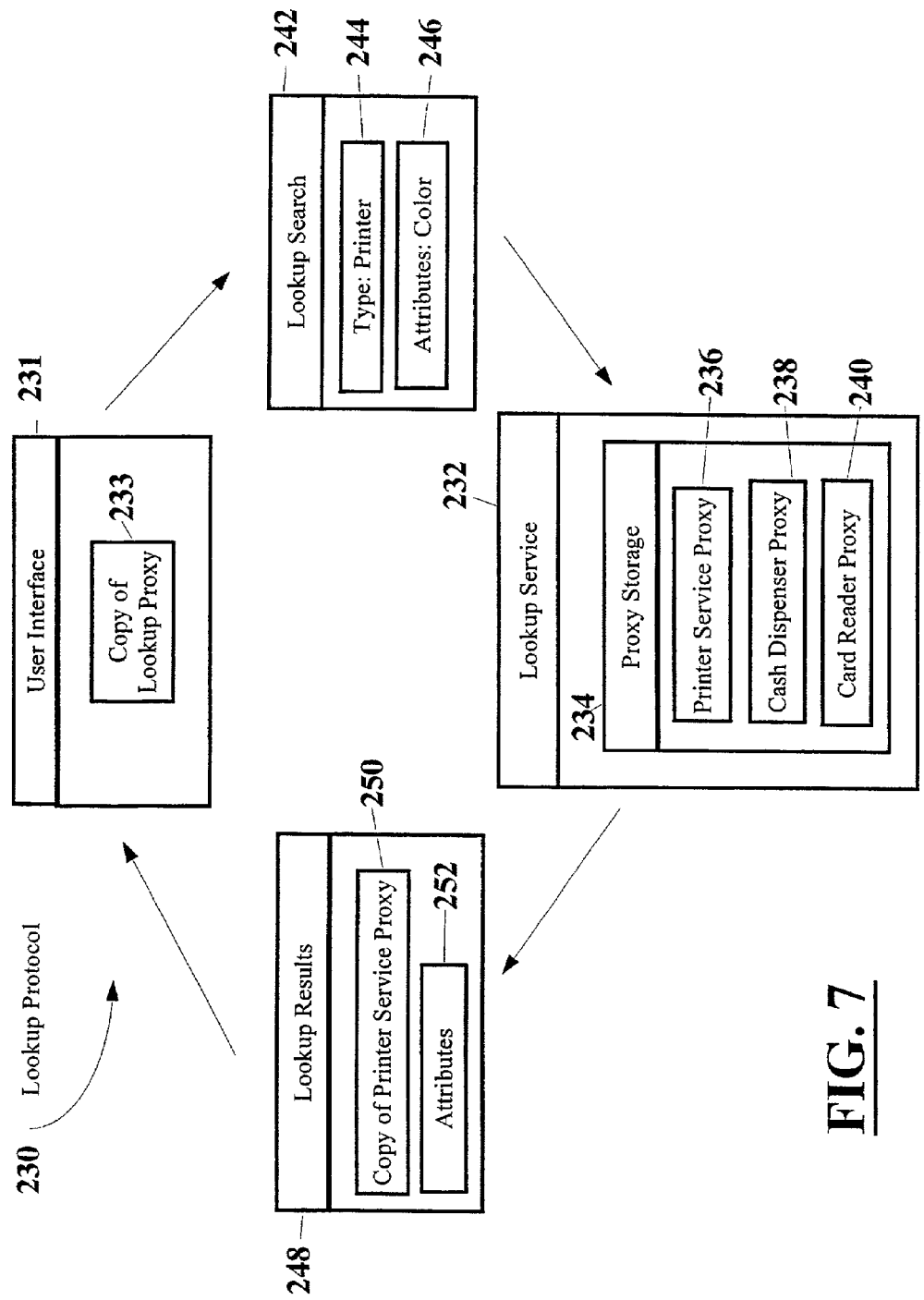

Once a service has joined the network, its service proxy is available for other services on the network to download. FIG. 7 schematically represents a lookup protocol 230 of the exemplary embodiment. Here a user interface service 231 invokes a lookup method of the lookup service proxy 233 that performs a search of a lookup service 232 for a specific service. The lookup search method arguments 242 include a type 244 of service that is desired and a list of specific attributes 246. For example, if the user interface service requires a connection to a color printer, the arguments 242 of the lookup search specify a service of type "printer" and attributes of "color".

The lookup service 232 is operative to identify which of the registered services 236, 238, and 240 in the proxy storage 234 match the search arguments 242. The lookup service sends the results 248 of the lookup to the searching service 231. The results include a copy 250 of any matching service proxies (in this case a copy of printer service proxy 236) and corresponding attributes 252.

Figure 8:
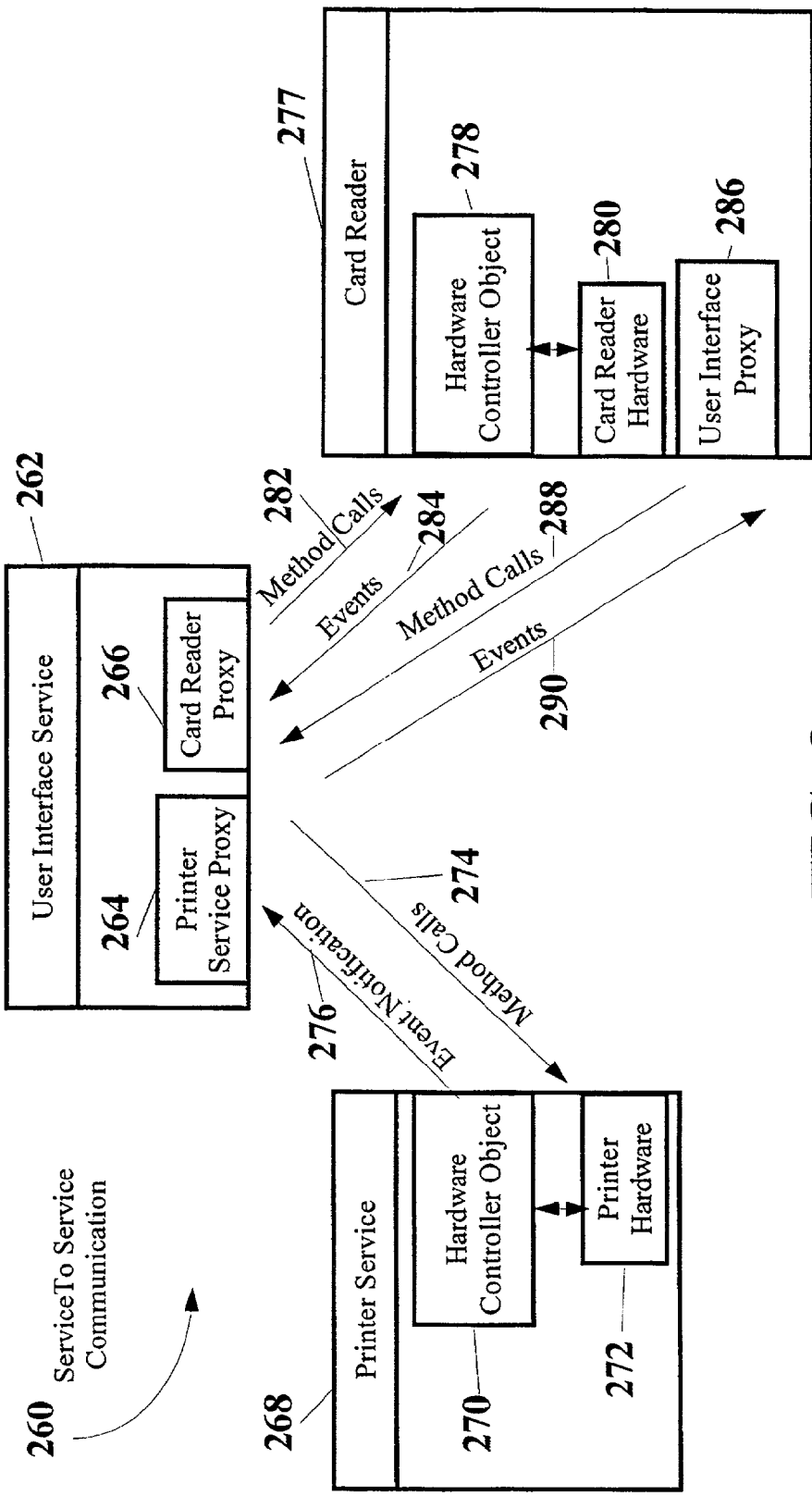

Once a service has acquired a service proxy to a service, it may invoke methods and register for event notification from that service. FIG. 8 schematically represents an exemplary method for service to service communication. Here a user interface service 262 has obtained the service proxies 264 and 266 for two services: a printer service 268 and a card reader service 277.

The user interface service 262 is operative to invoke method calls 274 and 282 from the service proxies which remotely invoke methods of hardware controller objects 270 and 278, respectively. The hardware controller object methods in turn control the functional hardware elements 272 and 280 of the respective services. For example, a print service proxy 264 for a printer service 268 has a print method with text data as an argument. Calling the print method will remotely call the corresponding print method on the printer service 268 which physically has the hardware 272 print out the text.

The methods of the proxies do not necessarily correspond one to one with the methods of the hardware controller objects. The methods of the proxies can perform various types of validations or manipulations of the method arguments before remotely calling methods in the service. For example, the print methods for a printer service may accept images in bitmap format only. However, the corresponding print method of the proxy for the printer service may include addition processing functionality to convert images from other formats to a bitmap format before calling the remote functions of the print service. In addition the proxy methods may invoke combinations of remote methods in the service to perform the desired operation.

In other embodiments such as where the printer service is in the form of firmware, the printer service proxy may be operative to send messages over the network with a proprietary protocol that can directly control the printer hardware.

In the exemplary embodiment of the present invention, services are also operative to have the service proxies register for event notification from the service. For example, the print service may include a complete event. When the printer service 268 has completed printing text it calls this event. If the user interface has registered this event, the printer service 268 will send an event notification 276 to the user interface service remotely across the network whenever a printer operation is completed.

As discussed above the user interface or application in the exemplary embodiment is also a service. Hence transaction services such as a card reader service 277 are operative to remotely invoke method calls 288 and register for event notification 290 with the user interface service.

A card reader service 277 of the exemplary embodiment is operative to acquire a user interface proxy 286 from a lookup service. This proxy will allow the card reader to invoke methods of the user interface such as an activation method, when the card reader first detects that a card is inserted into the reader.

In the exemplary embodiment the method for calling methods remotely from one service to another, and invoking events remotely is a function of the Java® Remote Method Invocation (RMI) classes in the JDK. The RMI protocol facilitates the ability of a service to invoke methods of another service across a network. RMI allows both data and full Java® objects to be passed from one service to another.

One of the advantages of using RMI for communicating with services across the network of an ATM, is that the physical hardware of a service appears from the programmer's point of view as just another Java® object with methods for performing certain functions. Such a system is much easier to develop and modify, because the programmer of an ATM user interface no longer is required to understand all the intricacies of the low level hardware of a service.

In the exemplary embodiment, the configuration of the apparatus and system is automatically changed in response to the connection and removal of services. As previously discussed, each service that is connected to the ATM, registers with a lookup service (and/or other services) through operation of the processors associated with each service. This registration is effective for a period of time which is referred to as a "lease". When the lease expires the service (if it is still connected) reregisters and thereby negotiates a new lease with the lookup service and/or other services. If the service is disconnected the current lease expires and is not renewed. When this occurs the service is automatically eliminated from the ATM configuration. Preferably the lease periods are set so that removed services cease to be registered before methods thereof are attempted to be invoked. For example in some ATM embodiments it may be desirable to require each service that is present to negotiate a new lease at the start of each transaction so that the configuration of available services for carrying out the transaction is determined. Of course other lease periods, and lease periods which differ depending on the character of the particular service may also be used.

Figure 9:
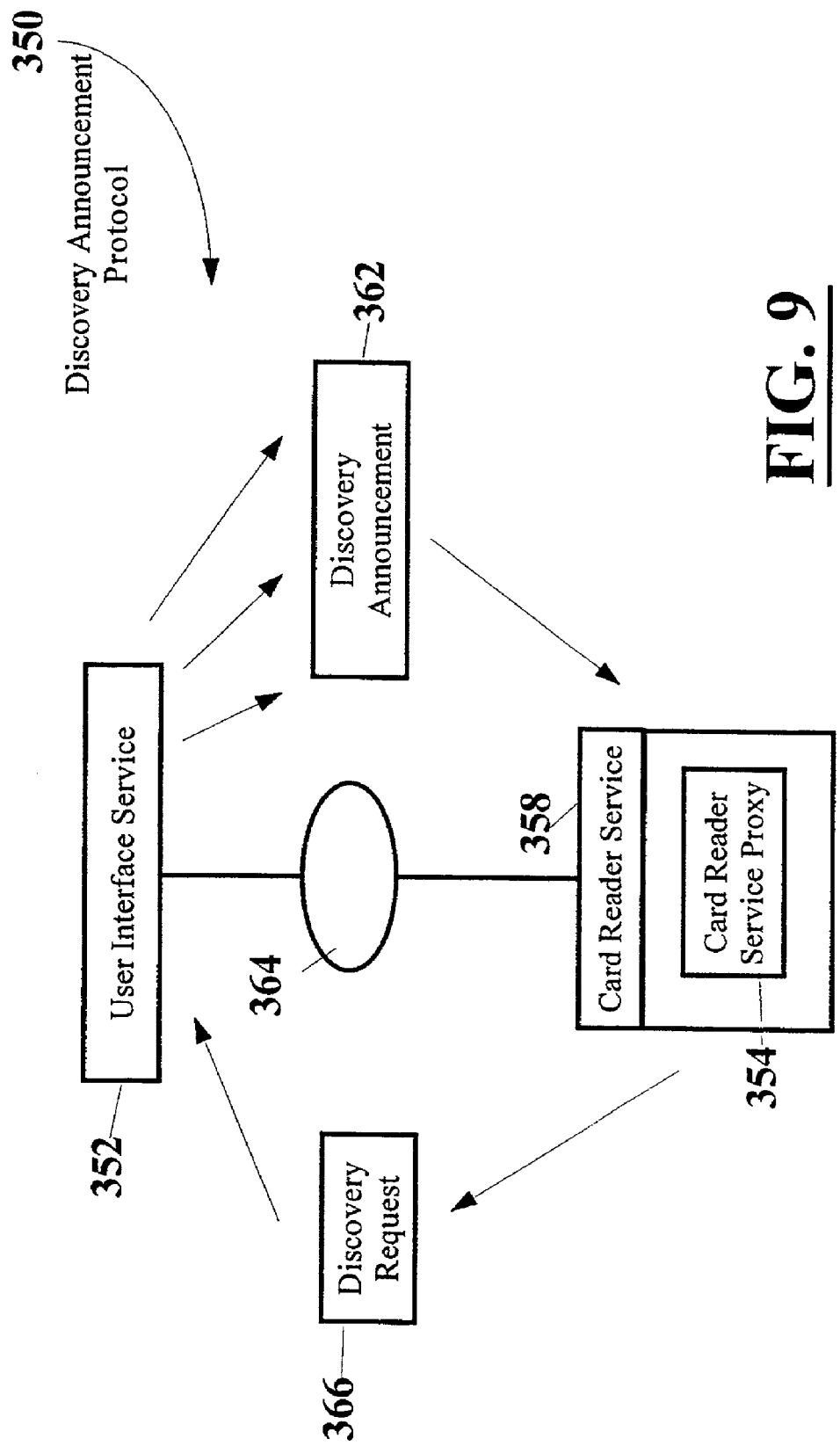
FIG. 9 schematically represents a discovery announcement protocol.

The embodiments discussed above have a lookup service that is responsible for registering services on the network and which serves as a repository for service proxies. In alternate embodiments of the present invention the ATM may be operative to function without a lookup service. FIG. 9 is a schematic representation of a discovery announcement protocol 350. In the discovery announcement protocol a user interface service 352 is operative to initiate the discovery process between itself and other services on the network, whereby the user interface acquires a service proxy 354 directly from individual transaction services 358.

When the user interface service 352 is first connected to the network and periodically thereafter, it is operative to multicast a discovery announcement 362 across the network 364 which requests that services on the network begin the discovery process and register with it. Interested services upon receiving this announcement are operative to unicast a discovery request 366 directly to the announcing user interface service 352 rather than to a lookup service. The user interface service then participates in the "discovery" and "join" processes just as if it were a lookup service.

In addition this discovery announcement protocol 350 can also be used by a lookup service, in cases when a lookup service is added to a network with preexisting services. In this case the lookup service can announce its presence on the network with the discovery announcement so that services will register with it.

Figure 10:
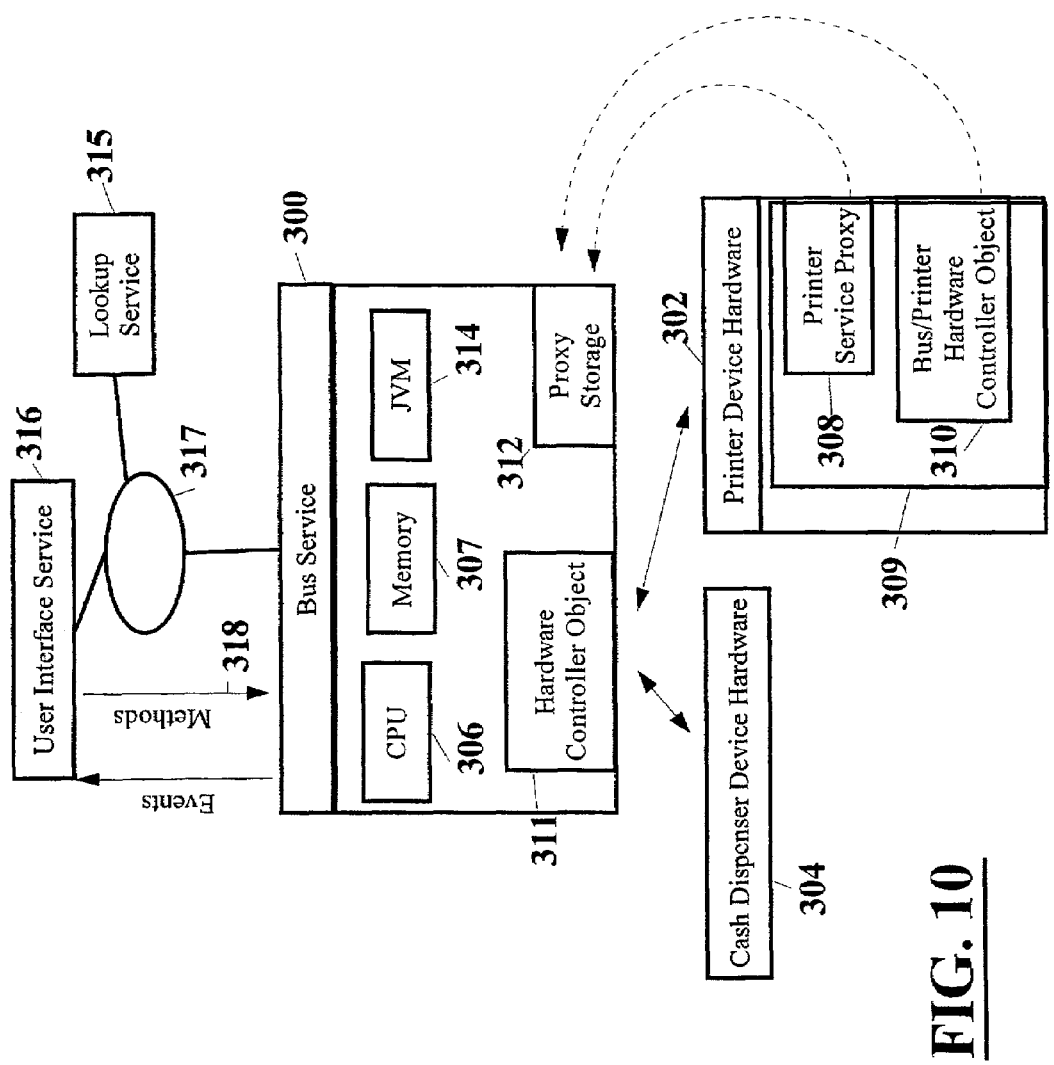
FIG. 10 is a schematic representation of an ATM bus service.

The exemplary embodiment of the present invention includes services that are fully capable of configuring themselves on the network. However, for legacy services or new services that do not have a network interface, a special bus service can be employed as discussed above. FIG. 10 is a schematic representation of an ATM bus service 300 that enables the connection of devices 302 and 304 (in this case a printer and a cash or sheet dispenser, respectively) that do not include object oriented and networkable features.

Here bus service 300 includes all the elements of other transaction services. It includes a CPU 306, a memory 307, storage 312, and a JVM 314 for running Java® programs for discovering and joining a network. For legacy devices the service bus may come pre-loaded with multiple service proxies for each hardware service that can be physically attached to the service bus. Physical attachment may be with an RS 232 serial connection for example, or via a proprietary connection. The service proxies are uploaded to the lookup service during the join process of the bus service. From the point of view of other services on the network, all of the legacy services appear to be objects capable of receiving remote method calls. The bus itself handles the routing of messages between the network and the legacy services.

In this described embodiment of the bus service 300, the devices 302 and 304 include storage for downloadable software objects. As shown schematically with reference to printer device 302, this storage 309 is used to hold service proxy 308 and a hardware controller object 310. The bus service 300 is operative to download a copy of the service proxy 312 and a copy of the hardware control object 311 from the device 302. When the bus service connects to a lookup service 315, the bus service is operative to upload a copy of the service proxy 312 to the lookup service 315 using the discovery and join protocols as discussed previously. Other services on the network may then acquire a copy of the service proxy from the lookup service 315.

The bus hardware controller object 311 runs in the JVM 314 of the bus service 300 and has methods for controlling the physical hardware of the device 302. When the user interface service 316 invokes a service proxy method call 318 across the network 317, the bus hardware controller object 315 executing in the JVM 314 is operative to control the device 302. From the point of view of the user interface service 316 or another service on the network, the devices 302 and 304 appear to be object oriented services.

The devices for this bus service 300 are a hybrid between the complete slave legacy devices of the prior art and the full network enabled services. These hybrid services include their own service proxies, but do not require a CPU and memory for running a JVM. Although they have a lower cost to produce, they are intimately tied to the bus design. Also, the bus hardware must have a specific connection for each type of device.

One of the advantages of an ATM with networkable transaction services, is that the form of the ATM is flexible. Prior art ATMs are limited in the number of serial and parallel ports that are available for connecting peripherals. When all the ports are filled, a new communication card with additional ports must be installed in the ATM. An ATM that uses networkable transaction services can scale to include as many services as the bandwidth of the particular network topology can handle. With an Ethernet network based on 10-base-T for example, theoretically hundreds of Jini enabled devices could be connected to the network of an ATM. Of course a prior art ATM would rarely require more than a dozen or so peripheral devices. However, the ability to easily connect a large number of transaction services creates new opportunities for designing ATMs.

Figure 11:
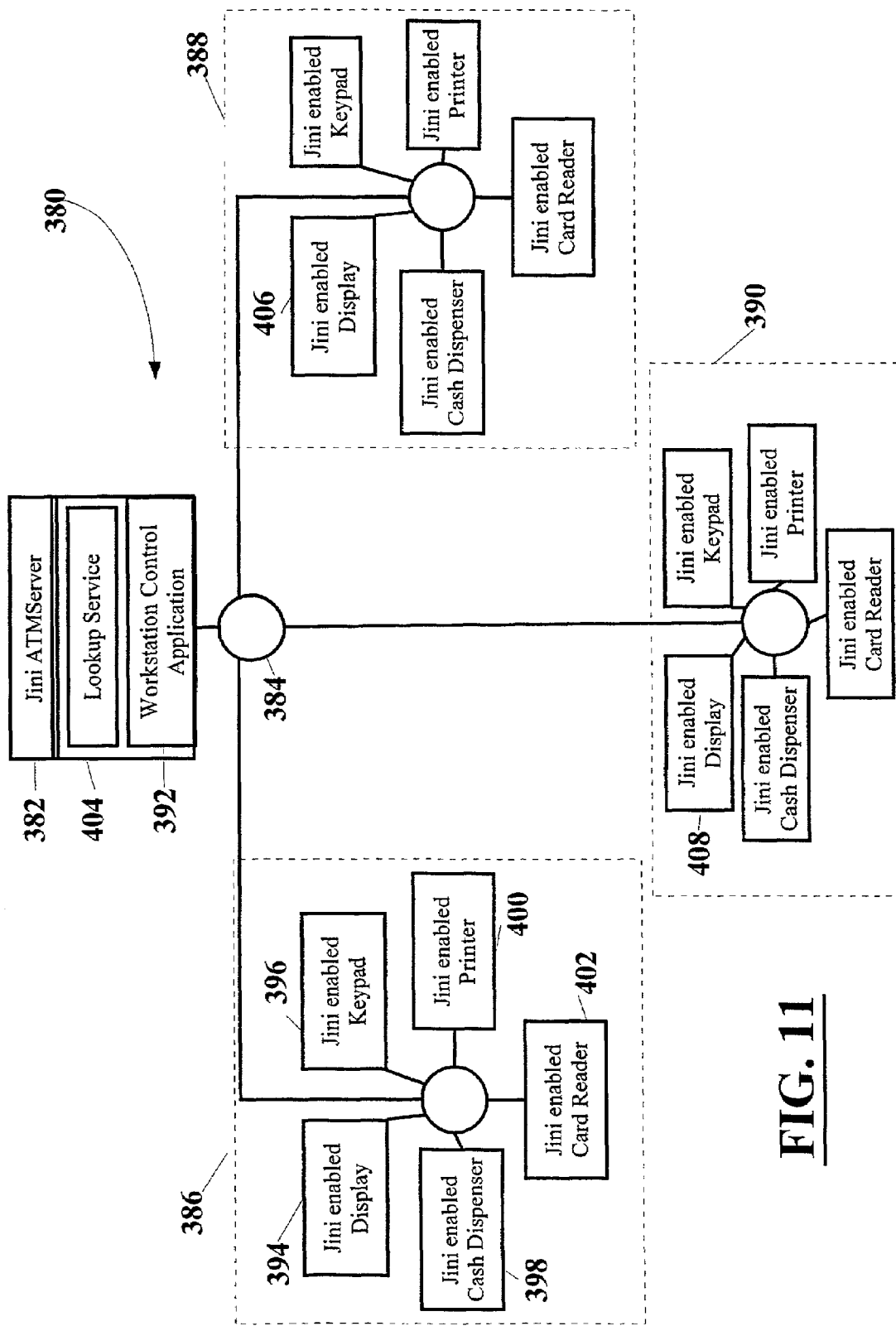
FIG. 11 schematically represents a single ATM server computer that is operative to run an ATM interface application that controls the functionality of a plurality of Jini enabled ATM workstation services.

FIG. 11 shows an alternative embodiment of an ATM 380 in which a single ATM server computer 382 is in operative connection with a network 384 that connects a plurality of different ATM workstations 386, 388, and 390. Each ATM workstation comprises a set of transaction services. However because, each service is in network communication with a common server computer 382, all three ATM workstations 386, 388, and 390 can be controlled by a single Jini enabled application 392. This application 392 uses service proxies for each transaction service to control the functionality of each of the three ATM workstations.

In this example the ATM workstation 386 includes an output service 394 which includes a graphical display, an input device service 396 such as a keypad, a cash dispenser service 398, a print service 400, and a card reader service 402. Each of these services is Jini enabled and are operative to discover and join with a lookup service 404 when the services are first installed on the network 384. The application service 392 controls each service, and is operative to have an independent ATM interface be displayed with each of output service 394 and output services 406 and 408 on ATM workstations 388 and 390 respectively. Thus a single ATM server 382 can manage a plurality of independently operable ATM workstations.

Such a design offers advantages over prior art designs. To upgrade the interface menus for each ATM workstation, only the application service 392 located on the ATM server 382 needs to be upgraded. This design offers centralized configuration, management, and security, and allows the physical components of each ATM workstation to be easily upgraded by replacing or plugging in additional Jini enabled transaction services.

The exemplary embodiments of the ATMs previously discussed have primarily been concerned with using Jini protocols to produce an improved ATM comprising networkable transaction services. However, the ability to configure an ATM without requiring an operator to load new device drivers from a CD-ROM for example, offers the unexpected benefits of producing an ATM that can be configured on the fly depending on the needs of its owner. Hence an alternative embodiment of the ATM of the present invention is one that is portable and that connects to transaction devices as needed. Such an ATM could be personally owned by a private individual and be used to conduct personal banking transactions, to pay for purchases, and to store electronic money. Further, personal account information relating to credit cards, utility customer numbers, medical plan numbers, debit cards, and information corresponding to any other type of account that money or value is either transferred to or from, can be stored in the personal ATM. In addition, the inclusion of multiple types of account information and means for storing value in a single personal ATM, reduces the need for a person to carry numerous types of credit and banking cards.

For this embodiment a portable device that is operative to run a JVM and to connect to a network using discovery/join/ lookup protocols such as Jini, can be used. Examples include a notebook computer, a cell phone, a pager, and a Personal Digital Assistant (PDA). As a personal ATM, such devices are configured to run a personal ATM service application that performs banking operations as is done at non-portable ATM workstations. Unlike prior art ATMs, these portable devices do not include attached currency dispensers. However, because the personal ATM service is Jini enabled, it can connect to additional transaction services as needed, such as a cash dispenser service of a Jini enabled public or multi-user ATM workstation. Such a public or multi-user ATM that is operative to allow personal ATMs to connect to it is referred to herein as a host ATM.

Figure 12:
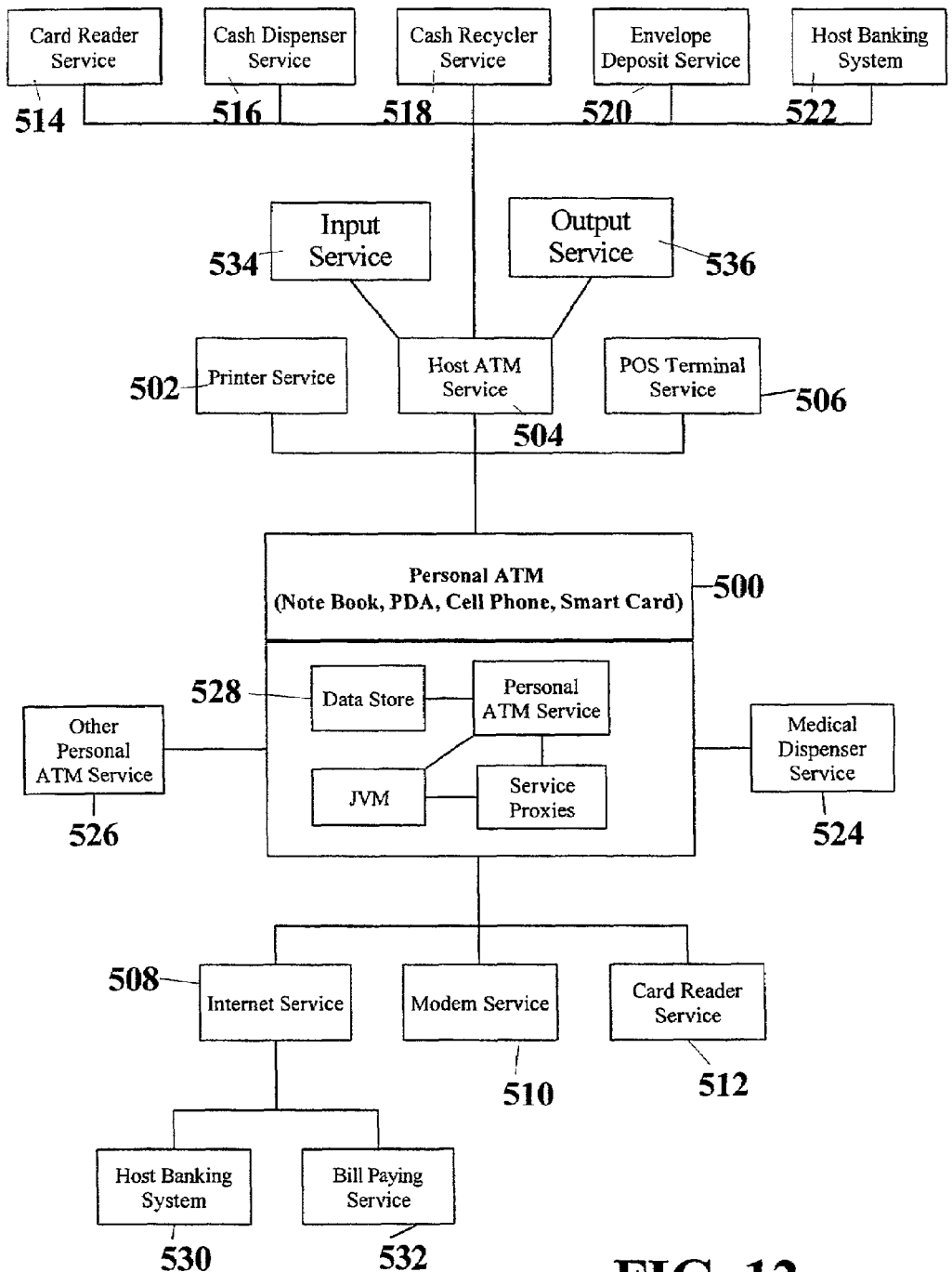
FIG. 12 schematically represents a personal ATM that is operative to perform banking transactions by connecting to various ATM services.

FIG. 12 shows a schematic representation of an exemplary personal ATM 500. The personal ATM 500 is shown in connection with various types of transaction services. Some of these transactions services are local connections to the physical personal ATM including a print service 502 such as an attached printer, a modem service 510 such as an attached PC card modem, and a card reader service 512 such as a smart card reader. The printer service can be used to print banking transaction receipts or even full account statements. The modem service can provide a connection to a dedicated host banking system such as an online banking system clearinghouse through which a user can accomplish transactions such as transfers of money between accounts, payment of bills or purchases of goods or services. The card reader service 512 can provide access to a smart card for storing electronic money, or to read the account information from a magnetic-stripe card or other article.

The personal ATM 500 can be temporarily connected to another Jini enabled ATM that includes additional services. An exemplary host ATM 504 can provide access to services for withdrawing cash from a cash dispenser service 516, for depositing cash with a cash recycler service 518, and for depositing envelopes with an envelope deposit service 520. Further if desired and/or if the personal ATM does not have its own modem service, the host ATM 504 can provide access to a host banking system service 522. The host ATM can also provide access to other types of services not included with the personal ATM. For example, if the personal ATM 500 does not have its own card reader, the host ATM 504 can provide access to a card reader service 514.

The personal ATM 500 can temporarily connect to other types of host machines which provide services. Examples include a point of sale (POS) service 506 which may be a part of a payment terminal located in the checkout line of a grocery store, a medical item dispensing machine service 524 located at a pharmacy, a medical payment terminal located in a doctor's office, or even someone else's personal ATM service 526. Such connections allow the personal ATM to directly pay for purchases by transmitting information which identifies the user's personal credit card or debit card accounts stored locally in a data store 528 in the personal ATM 500. The personal ATM may also be operative to store electronic money in local memory in an encrypted format, and may transfer the electronic money to a connected service such as the medical dispenser service 524 to pay for a dispensed medical item. For personal ATMs that have access to the Internet, an Internet service 508 can provide access to a host banking system service 530 or a bill paying service 532.

The examples of computing devices such as cell phones and PDAs that may be suitable for use as a personal ATM typically include local displays and input devices. However, the present invention also encompasses other computing devices such as smart cards which do not have displays and input devices. Any smart card that includes a CPU, memory, and a non-volatile storage for running a JVM, or includes dedicated firmware for interacting with other services using Jini protocols, or other comparable components and features, may also be used as the computing system of the personal ATM of the present invention.

To interact with a personal ATM on a smart card, the smart card can be put in operative connection with an output service 536 such as a display screen and an input service 534 such as a keypad. In the preferred exemplary embodiment this is accomplished by inserting the smart card into a smart card reader of a Jini enabled host ATM or some other host machine that includes a display and input device. An example of such a machine is a notebook computer. Once connected, the smart card can use the discover/join/lookup protocols to pass service proxies between itself and the host machine.

In one exemplary embodiment the smart card downloads proxies for the display and input services of the host computer. These proxies are used by the personal ATM service(s) in the smart card to display an ATM menu screen on the output service of the host machine, and to receive input signals from the input device of the host machine.

In an alternative embodiment, rather than downloading display and input services, the personal ATM service(s) on the smart card uploads a personal ATM proxy service(s) to the host machine. This proxy includes a Java interface application which runs in the JVM of the computer system of the host machine. The Java application creates a user interactive ATM menu interface which displays on the output device of the host machine and accepts inputs from the input device of the host machine.

This described embodiment divides the functionality of the personal ATM across different computer systems. The personal ATM service(s) on the smart card may perform back-end operations of maintaining a data store of accounts, validating passwords, and/or storing electronic money, whereas the host computer executes the front-end interactive GUI application for interfacing with the personal ATM service(s) on the smart card as well as other services.

Figure 13:
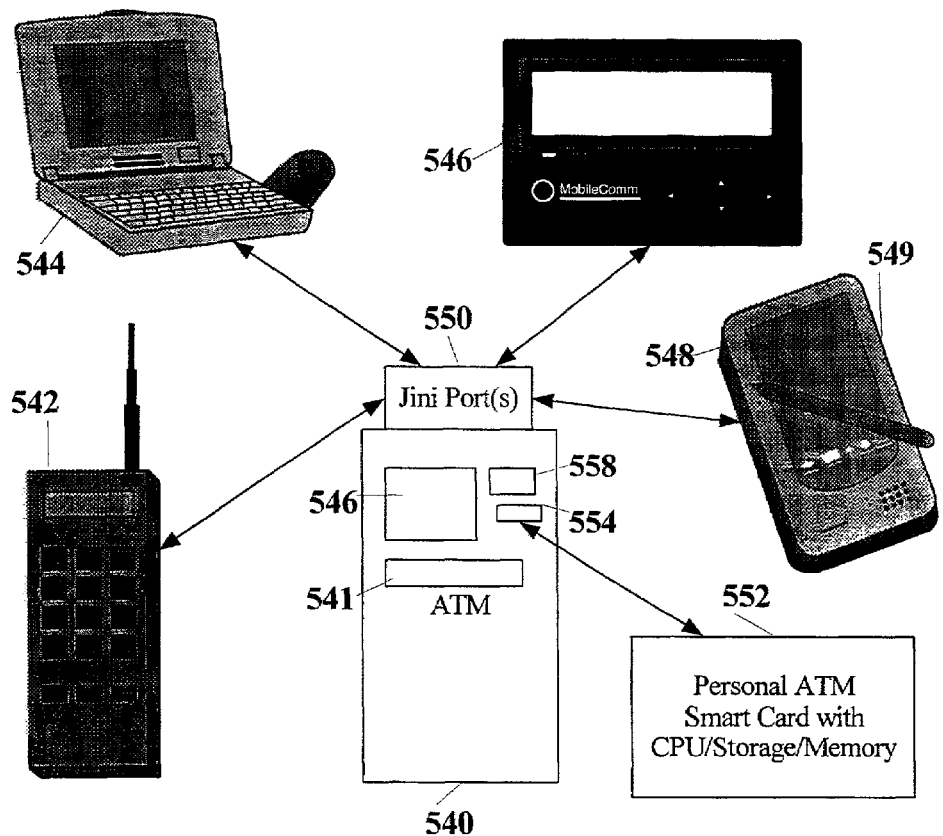
FIG. 13 schematically represents a plurality of personal ATMs that are operative to communicate with a host ATM for performing banking transactions.

FIG. 13 schematically represents a Jini enabled host ATM 540. This host ATM is operative as a stand alone ATM terminal and includes services such as a cash dispenser 541. However, host ATM 540 also includes one or more external network ports 550 that allow personal ATMs to connect with the host ATM. These ports 550 provide an access point for Jini enabled cell phones 542, notebooks 544, pagers 546, PDAs 548 and other devices that are operative as Jini enabled personal ATMs, which enables such devices to use the publicly available services of the host ATM. Once a personal ATM has discovered and joined with the Jini network of the host ATM, the personal ATM is operative to lookup and interact with available services, such as the cash dispenser 541.

For a personal ATM on a smart card, the host ATM includes a smart card interface 554 such as a smart card reader or a contactless interface for communicating with the card. Once the smart card is in operative connection with the host ATM, the service(s) on the smart card is operative to discover and join with the Jini network associated with the host ATM, just as the other described personal ATM computing devices.

The personal ATM on a smart card uses the display 556 and keypad 558 of the host ATM 540 to generate an interactive ATM interface menu for enabling interaction with a personal ATM service or several services on the smart card. For computing devices with built in displays, such as the PDA 548, the personal ATM user interface can be produced on their own display screen 549. Alternatively, such devices can use the display and keypad of the host ATM 540, as is done by the smart card personal ATM 552.

Once a personal ATM is connected to the host ATM 540, it may be operative to interact to perform such tasks as withdraw cash, receive deposits, and to transfer money to and from any of the accounts for which data is stored in the personal ATM and/or for which data representative of electronic money is stored in connection with the personal ATM.

Figure 14:
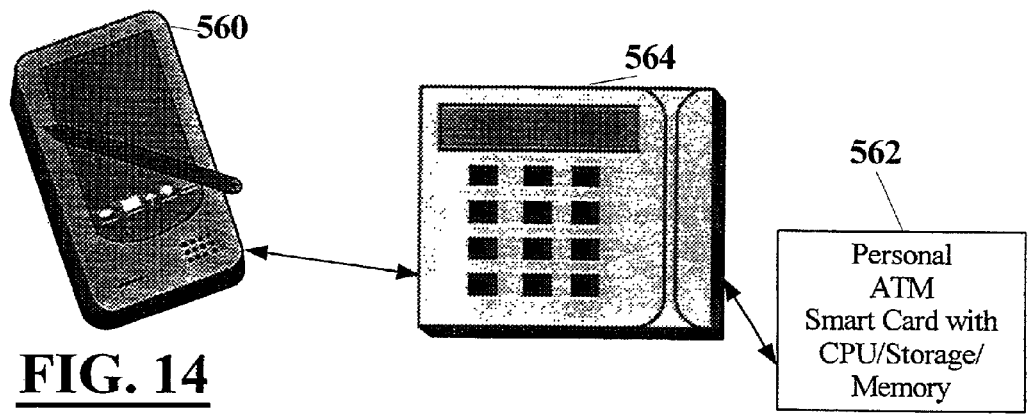
FIG. 14 schematically represents a point of sale (POS) device that is operative accept payments from account information stored in personal ATMs.

FIG. 14 schematically represents embodiments of personal ATMs 560 and 562 that are operative to discover and join with a Jini enabled host Point of Sale (POS) service which resides on a POS terminal 564. Once connected to the POS service, the personal ATM is operative for example to pay for purchases by transferring account information stored in the data store of the personal ATM to the POS service.

Figure 15:
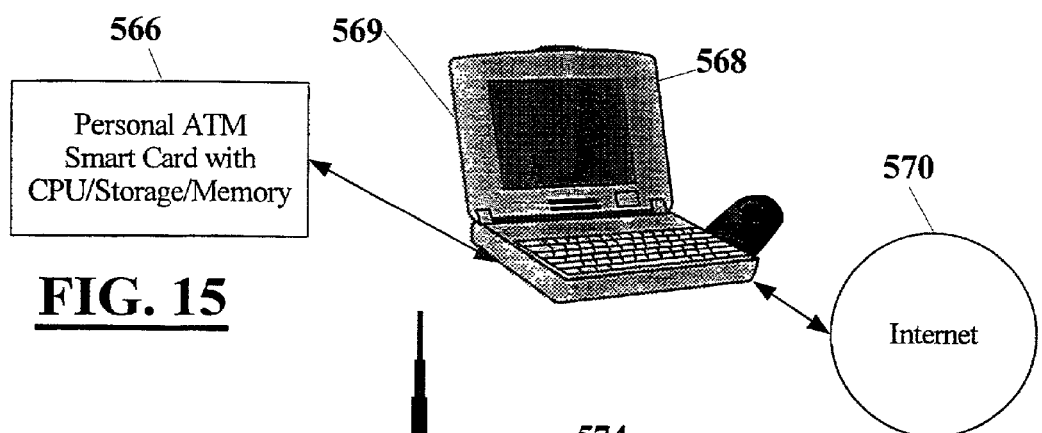
FIG. 15 schematically represents a personal ATM on a smart card that is operative to use the input and output devices of a notebook computer to perform banking transactions with an Internet service of the notebook computer.

FIG. 15 schematically represents embodiments of personal ATM 566 that is resident on a smart card. Personal ATM 566 may be placed in operative connection with a Jini enabled computing device such as host notebook computer 568 through an appropriate interface. Once the personal ATM 566 has discovered and joined with the notebook computer 568, the notebook computer is operative to lookup the personal ATM proxy for the personal ATM. This ATM proxy is operative to display a Java based ATM user interactive menu on the notebook display 569. In addition, services of the notebook, such as an Internet connection service 570 are available for use by the personal ATM 566. The ATM proxy is operative to enable menu options for performing banking or other transactions such as transferring money between accounts and paying for purchases by using the Internet service 570 of the notebook 568.

Figure 16:
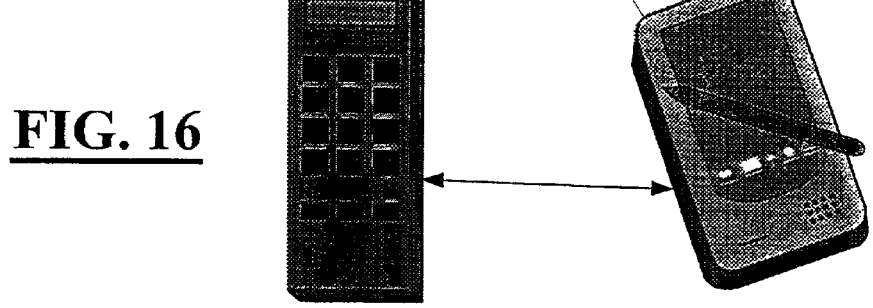
FIG. 16 schematically represents a personal ATM on a cell phone that is operative to perform transactions with another personal ATM on a PDA.

FIG. 16 schematically represents an embodiment of the personal ATM 572 that is operative to discover and join with the Jini network of a second personal ATM 574. In this manner the first personal ATM 572 is enabled to transfer data representative of electronic money to the second personal ATM 574. Also, each personal ATMs could share services with the other for purposes of carrying out transactions.

Figure 17:
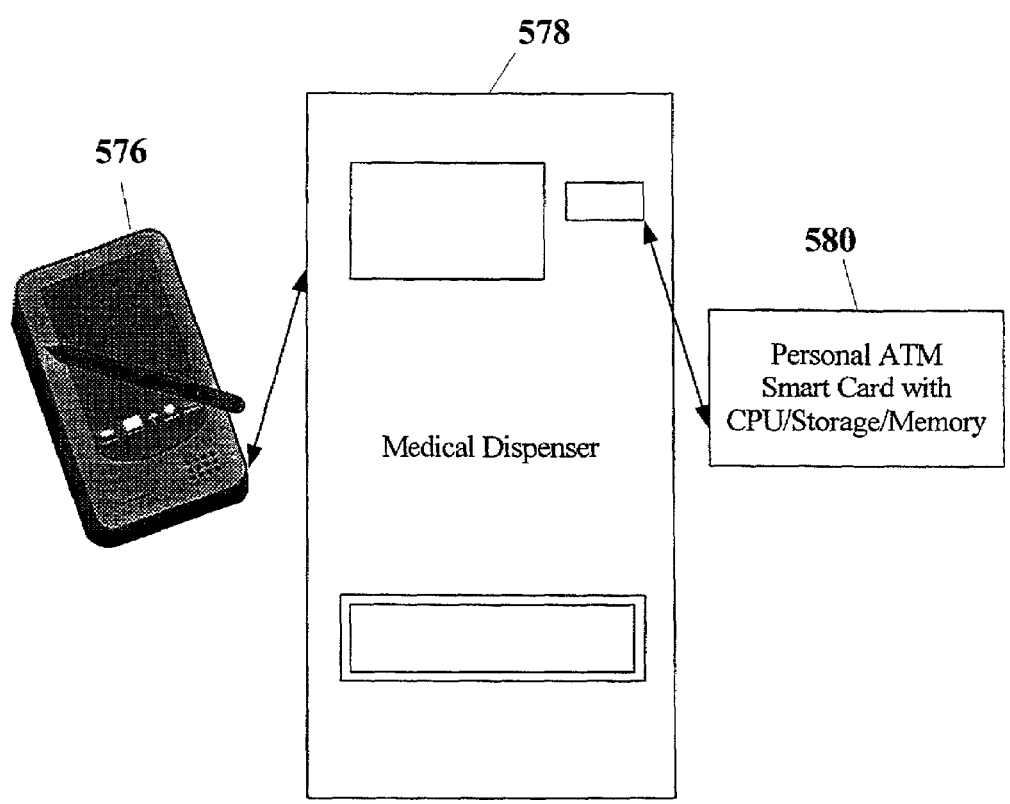
FIG. 17 schematically represents a dispenser that is operative to accept payment from account information stored in personal ATMs.

FIG. 17 schematically represents a Jini enabled host dispenser 578 that dispenses medical items. Host dispenser is operative to have personal ATMs 576 and 580 discover and join with it. The dispenser 578 includes a dispenser proxy which includes an interactive Java application for selecting items to purchase and dispense. For personal ATMs that include their own local display services, the dispenser proxy interface application can be uploaded and executed in the local JVM of the personal ATM. In other embodiments, as with embodiments of the personal ATM on a smart card, the dispenser interface application executes in the computing system of the dispenser and is operative to interact with the personal ATM through the personal ATM proxy.

Once a user has selected items to purchase with the dispenser proxy interface application, the personal ATM service is triggered by the dispenser service to make payment. This may be accomplished by either transferring electronic money or by providing credit/debit account information stored in the personal ATM. This information is used to accomplish payment and an appropriate record is made in the dispenser and the personal ATM.

Figure 18:
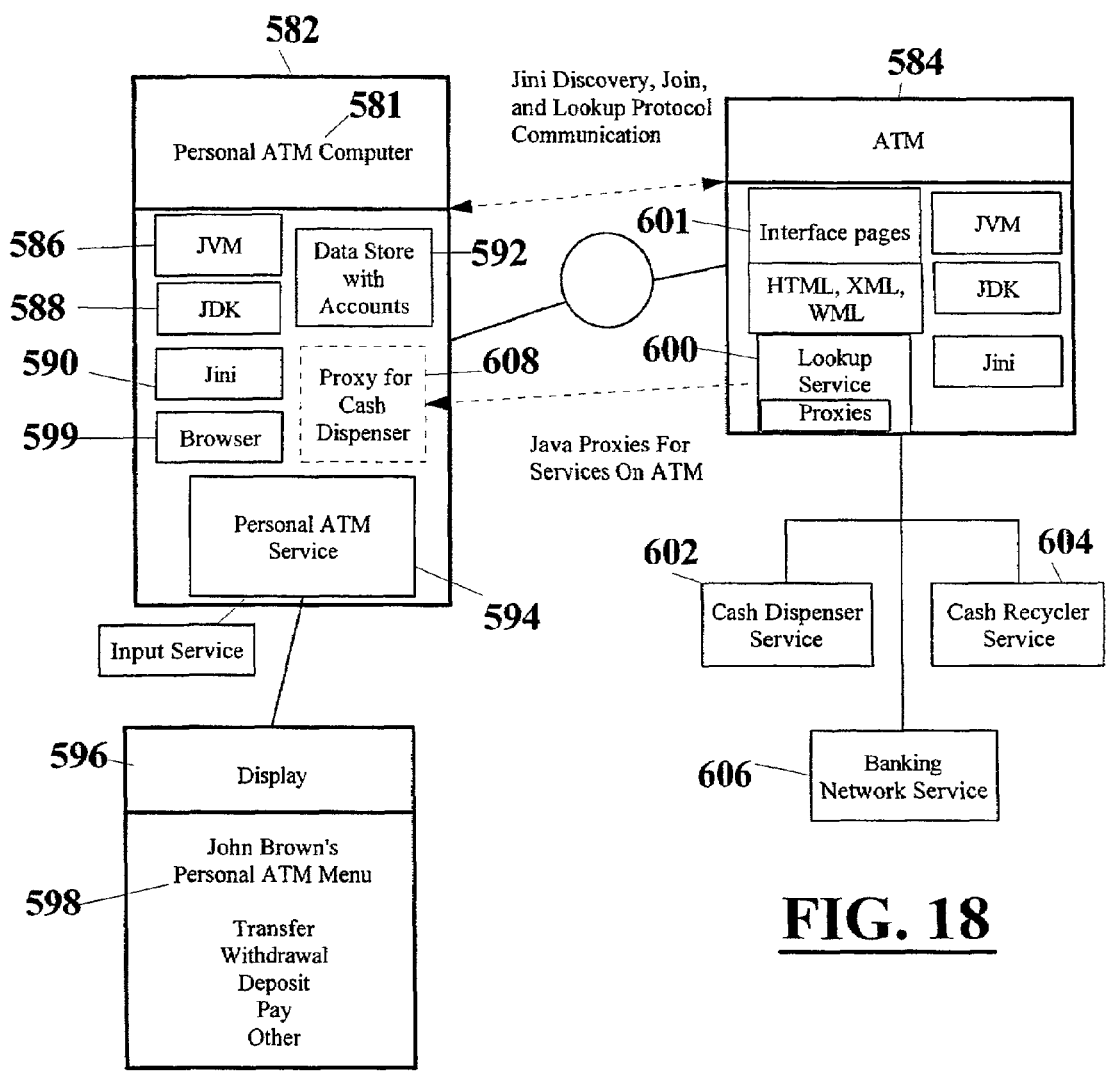
FIG. 18 schematically represents a personal ATM that is operative to perform banking transactions with services of a host ATM.

FIG. 18 schematically represents a personal ATM 582 in operative connection with a host ATM 584. Here the personal ATM includes a computing device 581 with a processor such as a PDA or cell phone with a local display screen 596. The personal ATM is operative to run a JVM 586 with a JDK 588 and Jini Classes 590. The personal ATM also includes a data store 592 that includes account information for credit cards, debit cards, and any other account which is a source of value. The personal ATM 582 further includes a personal ATM service 594 that is operative to output an interactive ATM interface menu 598 on the display screen 596.

The personal ATM 582 is operative to discover and join with the host ATM 584 which includes an ATM lookup service 600 and other transaction services such as a cash dispenser service 602, cash recycler service 604, and banking network service 606. The personal ATM is further operative to cause the processor to operate to look up these public services and to download corresponding proxies such as proxy 608. The personal ATM uses these proxies to interact with the host ATM responsive to human interaction with the ATM interface menu 598 of the personal ATM 582.

In this described exemplary embodiment the personal ATM service 594 is operative to generate a user interface menu 598 responsive to the types of public services that are available at host ATM 584. However, in alternative embodiments, the personal ATM may display a user interface menu that originates from the host machine. For example, when the personal ATM 582 joins with the host ATM 584, the personal ATM may lookup and retrieve a high level host ATM service proxy that encapsulates the functions of all of the publicly available services of the ATM host. Such a high level service proxy may include the necessary programming to display a user interface menu 598 with the display screen 596 of the personal ATM 582 for having the host ATM 584 perform a plurality of different types of transactions.

In another alternative embodiment the personal ATM may include a browser software function 599. The high level host service proxy may direct the browser 599 to retrieve from the host ATM 584 one or more user interface pages 601 for display in the browser 599. Such user interface pages 601 may include Hyper Text Markup Language (HTML), Extensible Markup Language (XML), Wireless Markup Language (WML), Java script, and any other type of instruction language that is operative to have the browser 599 output an interactive interface 598 with display screen 596 of the personal ATM 582.

It is recognized that different types of personal ATMs may have different types of display screens 596 with different performance characteristics. For example, a notebook computer may have a relatively large high resolution graphic display, whereas a cell phone may have a small low resolution character-based display. To accommodate either type of display, the exemplary embodiment of the present invention is operative to format the interface menu 598 responsive to the specifications of the display screen 596. For example if the interface menu 598 is generated by a high level service proxy, the service proxy is operative to output indicia for the interface menu 598 in a format that is appropriate for the display screen 596. If the interface menu is displayed in a browser responsive to interface pages, the personal ATM is operative to retrieve interface pages from the host ATM 584 that correspond to the display characteristic of the display screen 596.

This may be achieved by a host ATM that includes a plurality of different service proxies that correspond to different types of display screens. For example the host ATM may include service proxies for character based cell phone display screens and service proxies for graphical VGA display screens. The personal ATM may lookup and retrieve the service proxy that matches its particular resolution. In an alternative embodiment, the service proxy may be operative to determine the resolution of the display screen 596 when it is executed in the JVM 586 of the personal ATM 582. Based on this determination the service proxy may then construct and output a properly formatted interface menu 598 responsive to the determined resolution of the display screen.

For embodiments of the personal ATM that include a browser 599 for displaying interface pages, the host ATM may include different sets of these interface pages which are formatted for different resolutions and/or types of personal ATM display screens. Once the personal ATM has joined with the host ATM, the personal ATM is operative to retrieve the proper set of instruction pages responsive to the type of display screen that is being used.

Figure 19:
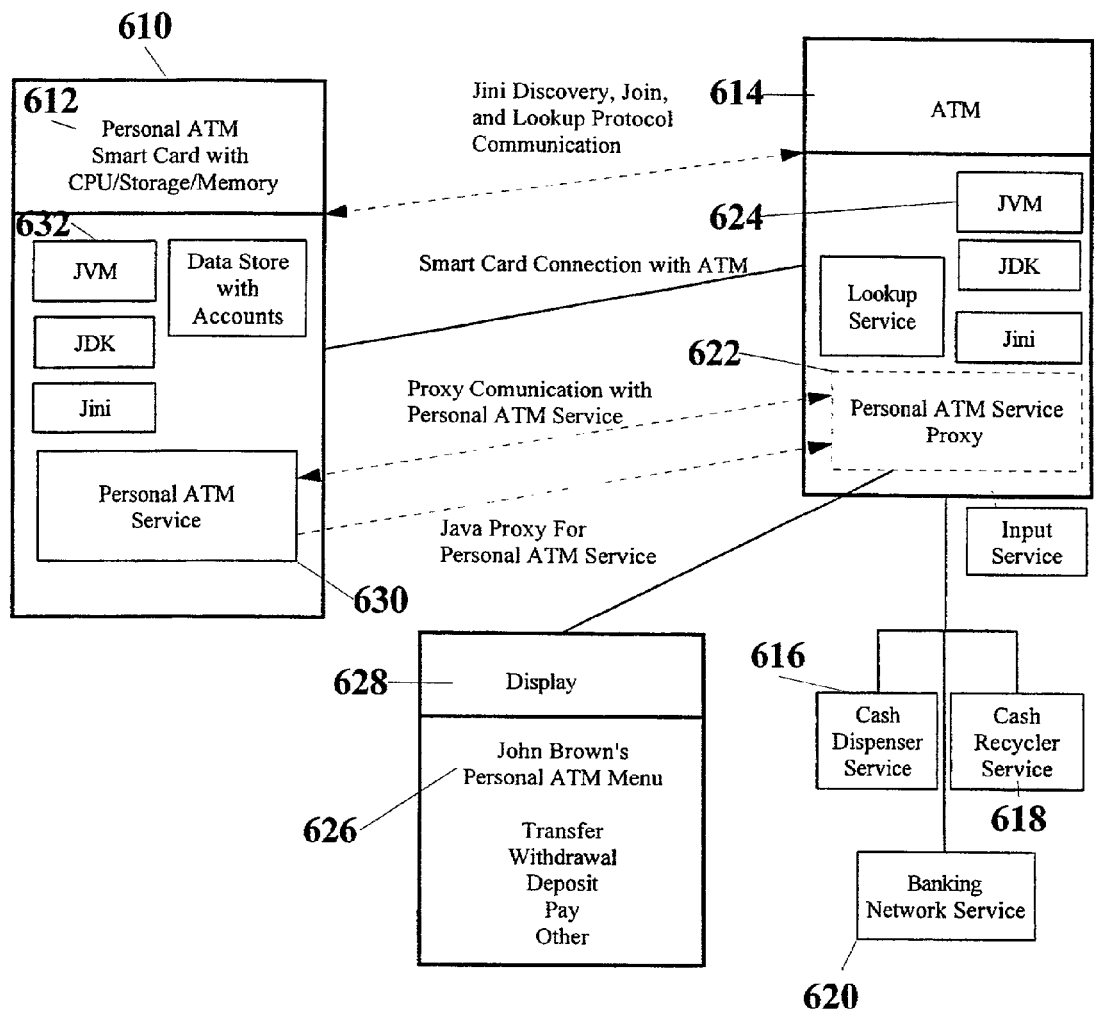
FIG. 19 schematically represents a personal ATM on a smart card that is operative to perform banking transactions with services of a host ATM.

FIG. 19 schematically represents an alternative embodiment in which the personal ATM 610 resides on a smart card computing device 612. Here the personal ATM 610 is in operative connection with a host ATM 614. However, rather than downloading proxies to the various transaction services 616, 618, and 620 from the host ATM 614, the personal ATM 610 uploads at least one personal ATM proxy 622 that is operative in the JVM 624 of the host ATM 614. The personal ATM proxy includes a Java ATM interface application that is operative to output an interactive ATM interface menu 626 on the display screen 628 of the host ATM 614.

The personal ATM proxy 622 is also operative to remotely call personal ATM object methods of the personal ATM service 630 operative in the JVM 632 of the personal ATM 610.

In this exemplary embodiment, the personal ATM comprises any computing device that includes a CPU, memory, and non-volatile storage operative to run a JVM, wherein Java objects running in the JVM are operative to discover and join with a network. However, other embodiments of the personal ATM may employ firmware that is specifically designed to interface with services on a network using discover and join protocols such as Jini. Other embodiments of the personal ATM may employ other networking protocols and systems that are operative to have devices automatically configure themselves on a network by passing internally stored device drivers across the network.

Figure 20:
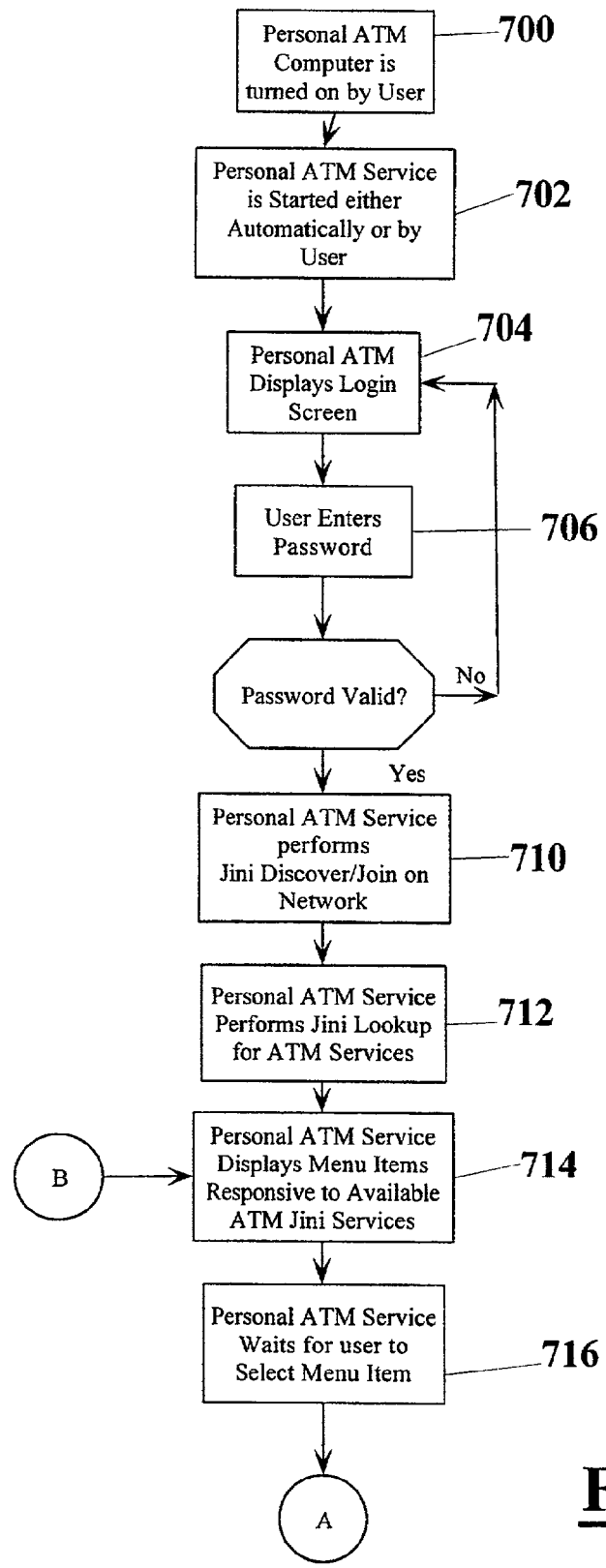
FIG. 20 schematically represents the process of using a personal ATM when the personal ATM is first activated.

FIG. 20 schematically represents the process by which a personal ATM such as the personal ATM shown in FIG. 18 initially operates. In this embodiment, the computing device includes its own local display screen. The personal ATM computing device is first activated by either manually activating the device on in step 700, or activating the device by some other method such as sensing a network connection. Once activated, the personal ATM is operative to execute the personal ATM service in step 702. The personal ATM service is an application which is either manually started by the user of the apparatus, or is automatically started by the operating system of the personal ATM computer.

Next the personal ATM service displays a login screen in step 704 which requires the user to enter a password which serves as validating data. In embodiments of the invention the validating data may include a code, thumb or finger prints, iris or retina scans or other biometric or other data that is capable of identifying a user, or combinations of such inputs. After a user enters a password in step 706, the personal ATM service validates the password in step 708. If the validation fails the personal ATM service jumps to step 706 and redisplays the login screen. If the validation succeeds the personal ATM service discovers and joins with a lookup service on the network in step 710. After joining the network, the personal ATM performs a lookup of available services on the network in step 712. The personal ATM in step 714 displays a list of selectable menu items in a personal ATM main menu screen. This list corresponds to the types of services that are available. For example if the network includes a cash dispenser, the personal ATM service will display a menu item for withdrawing cash. In step 716 the personal ATM service waits for a user to select one of the menu items.

Figure 21:
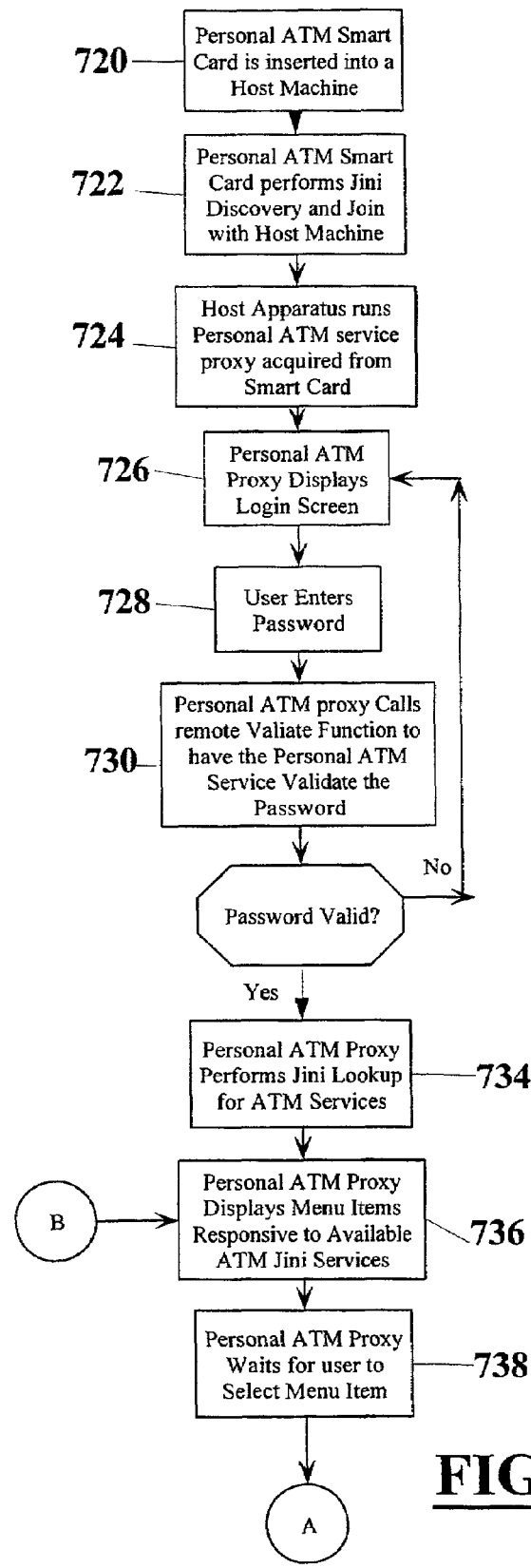
FIG. 21 schematically represents the process of using a personal ATM on a smart card when the personal ATM is first activated.

FIG. 21 schematically represents the method steps that are employed with a personal ATM as described with reference to FIG. 19. Here a personal ATM comprising a smart card is activated in step 720 by inserting the card into a smart card interface of a host machine. In an exemplary embodiment both the card and the host machine would use Jini protocols to configure and communicate with each other; however, alternate embodiments can use other network protocols operative to allow the smart card to automatically upload a personal ATM interface application to the host ATM. As discussed above, examples of host machines can include Jini enabled ATMs, dispensers, notebook computers, point of sale devices, and other personal ATMs.

Once activated, the smart card in step 722 performs Jini discovery and join with the lookup service of the host machine. As part of the join process the personal ATM uploads at least one personal ATM proxy to the host machine. In step 724 the host machine runs the personal ATM proxy in the JVM of the host machine which is operative in step 726 to display a login screen on the output device of the host machine. After the user enters a password or other validating data in step 728 through at least one input device of host machine, the personal ATM proxy in step 730 remotely calls a validate method of the personal ATM service running in the JVM of the smart card. This validate method is operative to test for validity of the identifying data entered in the host machine input service by comparing the identifying data with data stored in a data store of the smart card. The personal ATM service is further operative to pass the results of the validation test back to the calling personal ATM proxy. If the validation test failed the personal ATM proxy redisplays the login screen at 726 and waits for a user to reenter validating data. If the validation test succeeded as a result of correspondence between input data and stored data, the personal ATM proxy in step 734 performs a lookup of available Jini services. In step 736 the personal ATM proxy displays a personal ATM main menu on the output device of the host machine responsive to the types of available services. In step 738 the personal ATM proxy waits for a user to select one of the menu options with the input service of the host machine.

In the described embodiment, the personal ATM proxy includes its own Java application for displaying an ATM menu. However, in other embodiments, the host machine can include its own interface application. This host interface application would request that the user input validation information. To validate a password for example, the host application calls the validation method of the personal ATM service in the smart card using the object functions of the personal ATM proxy. To perform other transactions which require data stored on the smart card the host application may call other methods of the personal ATM proxy to retrieve this data.

FIGS. 22-25 are exemplary methods for using the personal ATM to withdraw cash, to pay a bill, and to dispense a medical item. All of these methods continue from the point where the personal ATM is displaying the personal ATM main menu. These methods are applicable for either of the processes described in FIGS. 20 and 21. For embodiments that use a computing device such as a PDA, the personal ATM menu is displayed on the local output device of the PDA. For smart card embodiments, the personal ATM menu is displayed on an output device of the host machine.

Figure 22:
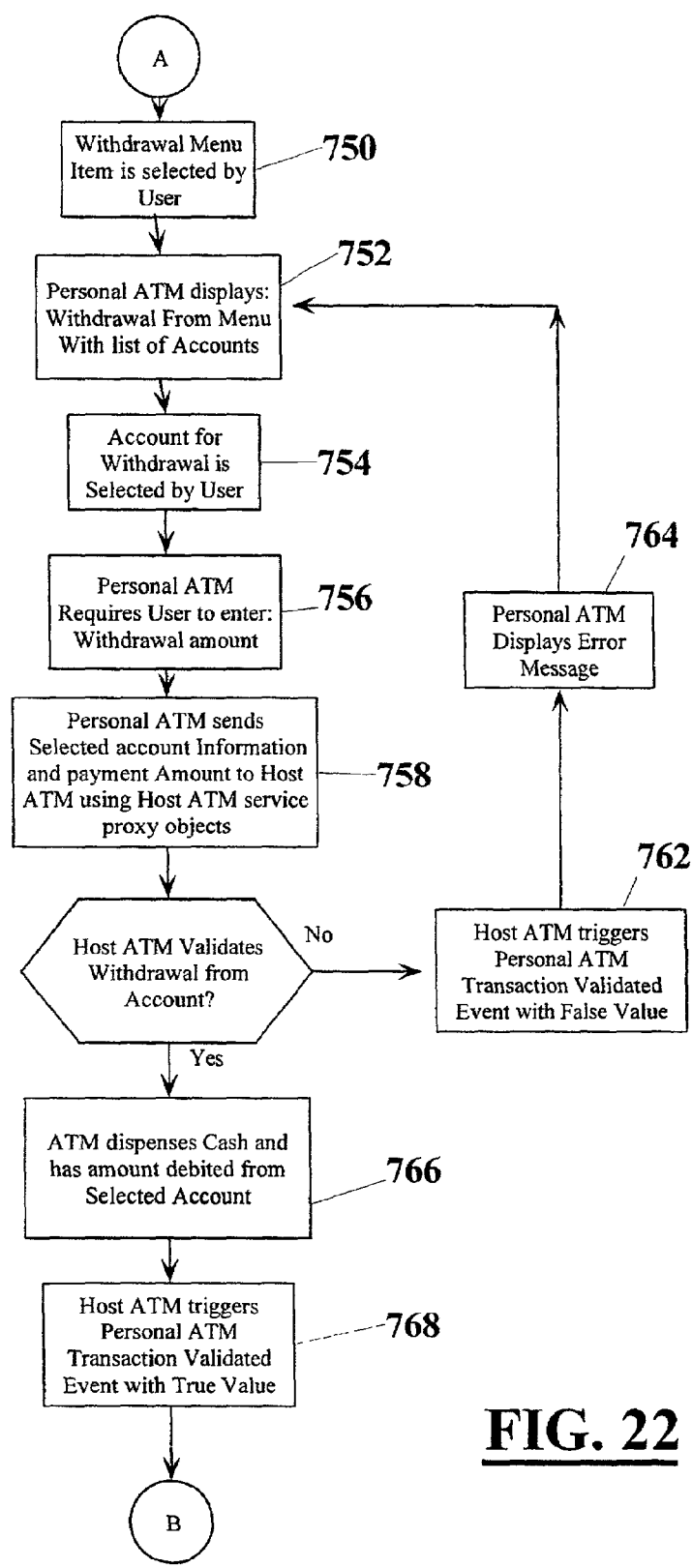
FIG. 22 schematically represents the process of withdrawing money with a personal ATM in operative connection with a host ATM that includes a cash dispenser service.

FIG. 22 shows the process for withdrawing cash from a host ATM. In a step 750 the ATM menu option for withdrawing cash is selected by the user. For this menu option the personal ATM displays a "withdrawal from" menu in step 752 which lists the available accounts for which information is stored in the data store of the personal ATM. Such accounts can include checking, savings, credit, debit, money market or any other account from which a host ATM is operative to deduct value. The personal ATM can include local data storage representative of accounts for electronic money, food stamp credits, college cafeteria points or any other type of stored value which is transferred from the personal ATM to the host ATM.

After the user selects an account in step 754, the personal ATM requires the user to enter a withdrawal amount in step 756. Next the personal ATM in step 758 sends the account information associated with the selected account and the withdrawal amount to the host ATM by calling withdraw methods of a cash dispenser proxy.

The host ATM is operative to validate the account information. If the withdrawal validation fails the host ATM triggers a validation event or method in the personal ATM with a false value in step 762. Consequently the personal ATM in step 764 displays an error message and returns to step 752 to display the "withdrawal from" menu.

If the withdrawal validation succeeds in step 766 the host ATM dispenses cash with the cash dispenser and has the withdrawal debited from or charged to the selected account. In step 768 the host ATM triggers the validation event or method in the personal ATM with a true value, wherein the personal ATM is operative to jump back to the steps 714 or 736 in FIGS. 20 and 21 respectively to display a refreshed personal ATM main menu.

Figure 23:
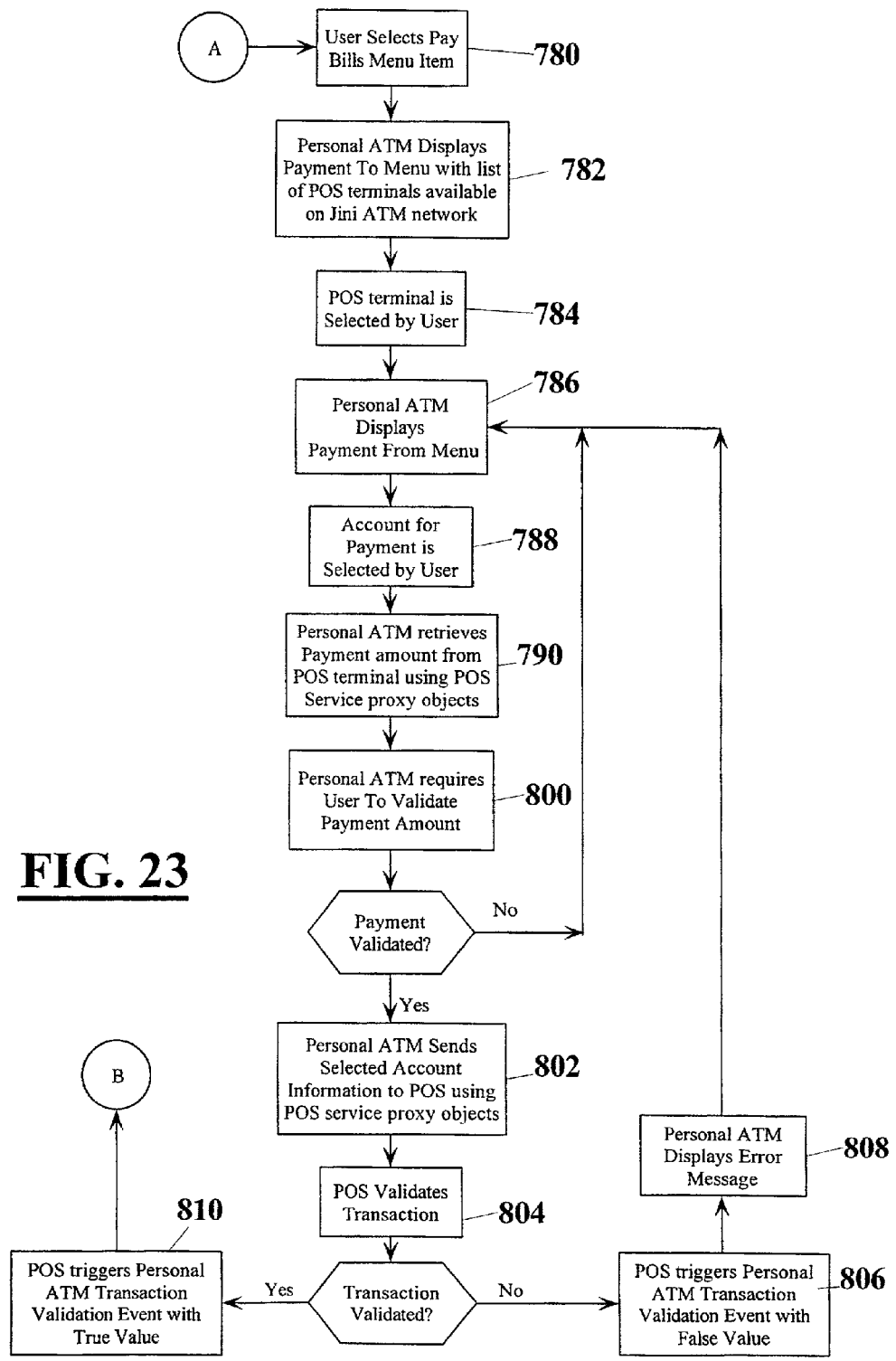
FIG. 23 schematically represents the process of making a payment with a personal ATM in operative connection with a host.

FIG. 23 is representative of a method for paying value with the personal ATM in connection with a host POS service. In step 780 a user selects a "pay bills" menu item from the main menu of the personal ATM. The personal ATM in step 782 displays a "payment to" menu with a list of POS terminals that the personal ATM is currently in connection with. After the user selects a POS terminal in step 784, the personal ATM displays a "payment from" menu with a list of accounts in step 786. After the user selects an account in step 788, the personal ATM retrieves the payment amount in step 790 from the host POS by calling POS service object methods of the POS proxy.

The personal ATM displays this amount in step 800 and requires the user to confirm that this amount is correct. If the amount is confirmed the personal ATM sends the selected account information in step 802 to the host POS by calling methods of the POS proxy. In step 804 the host POS validates the transaction using the account information. If the payment is not validated the POS triggers a validation event or method in the personal ATM with a false value in step 806. Consequently in step 808 the personal ATM displays an error message and returns to step 786 where the personal ATM displays the "payment from" menu.

If the validation succeeds in step 810 the POS triggers the validation event or method in the personal ATM with a true value and the personal ATM returns to the steps for looking up Jini services and redisplaying the personal ATM main menu.

Figure 24:
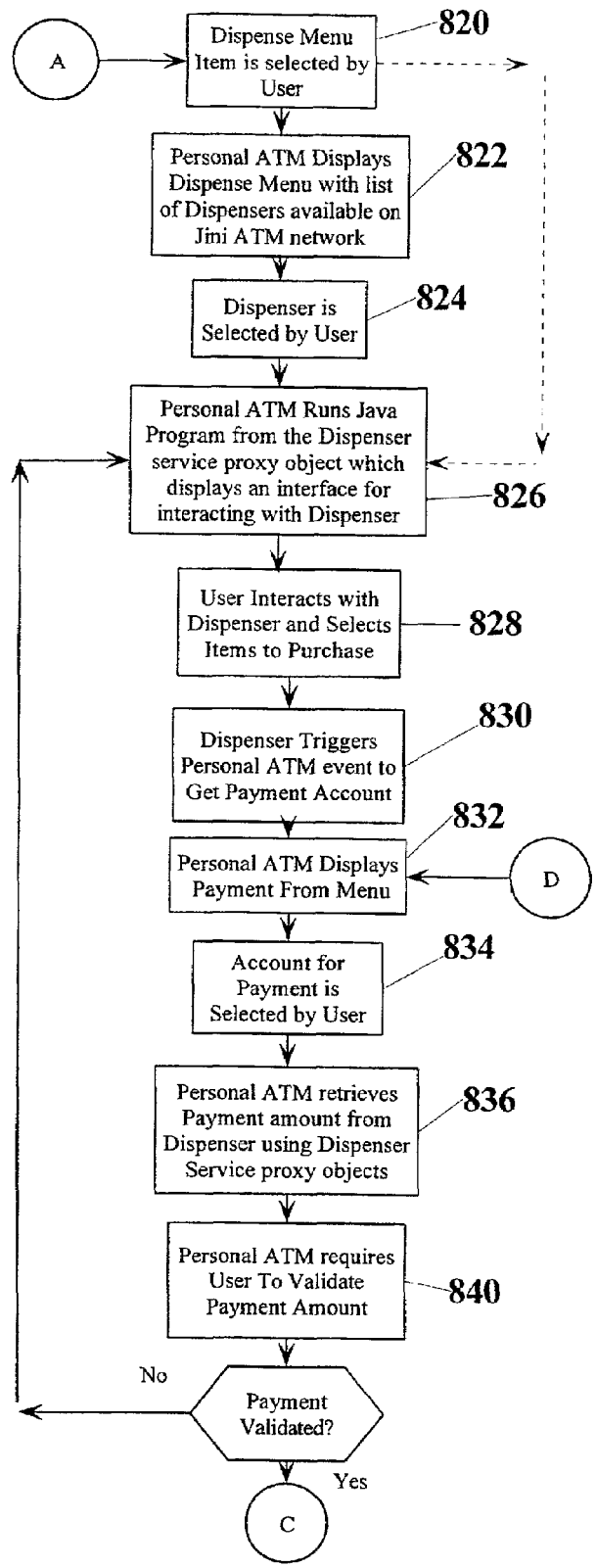
FIGS. 24 and 25 schematically represent the process of dispensing an item with a personal ATM in operative connection with a host dispenser.

FIG. 24 is representative of the method steps for dispensing medical items from a dispenser with the personal ATM. After a user selects the "dispense" menu in 820 from the main ATM menu, the personal ATM displays in step 822 a "dispense" menu with a list of host dispensers available on the Jini Network. If the personal ATM is only in connection with one host dispenser service, the personal ATM is operative to jump from step 820 to step 826.

When a user selects a host dispenser service in step 824 the personal ATM downloads a proxy to the selected dispenser. In one exemplary embodiment, the dispenser proxy includes a Java application that is operative to generate a dispenser interface for interacting with the host dispenser service. In alternative embodiments, the dispenser proxy may be operative to have the browser of the personal ATM display interface pages retrieved from the dispenser that correspond to a dispenser interface. In embodiments of the personal ATM on a smart card, the dispenser interface is displayed on the output device of the dispenser. When information such as user identifying information, an account number or credit card number is required, the dispenser is operative to communicate with the personal ATM service on the smart card through a personal ATM proxy.

The dispenser interface application in one exemplary embodiment is an interactive user interface which includes functionality to allow a user to select items to dispense. Such a dispenser interface will typically display items available to dispense prescription data, items selected to dispense, the cost of each item, the total costs of all selected items and/or any other information which may be appropriate and useful for making purchases or obtaining medical items from a dispenser. In exemplary embodiments of the invention these items may be a subset of items available in the dispenser which have been prescribed for the particular user of the personal ATM by a physician or other medical provider and which are selected responsive to a prescription service in connection with the dispenser. Alternatively, the principles of the invention may be applied to systems like that shown in U.S. Pat. No. 5,912,818 which is incorporated herein by reference, in which a medical professional dispenses items for selected patents and records are maintained regarding what the user has taken and each patient has received. Charges may also be appropriately assessed to the patients and inventory may be tracked and restocked as required.

In addition the complexity of the dispenser interface may be generated responsive to the type or resolution of the display device of the personal ATM. For example, if the personal ATM is a cell phone the dispenser interface may be limited to alphanumeric characters, whereas if the personal ATM is a notebook computer the dispenser interface may include complex graphics.

In step 828 the user interacts with the dispenser and selects items to dispense. When the user is finished selecting items to dispense, the dispenser interface in step 830 triggers a get payment account event or method of the personal ATM. Consequently in step 832 the personal ATM displays a "payment from account" menu with a list of available accounts to pay for the dispense of the selected items.

After the user selects an account in step 834, the personal ATM retrieves the payment amount from the host dispenser service with a method call of the dispenser proxy. In step 840 the personal ATM has the user validate that the payment is correct. If the payment is not validated, the personal ATM jumps to step 826 and redisplays the dispenser interface.

Figure 25:
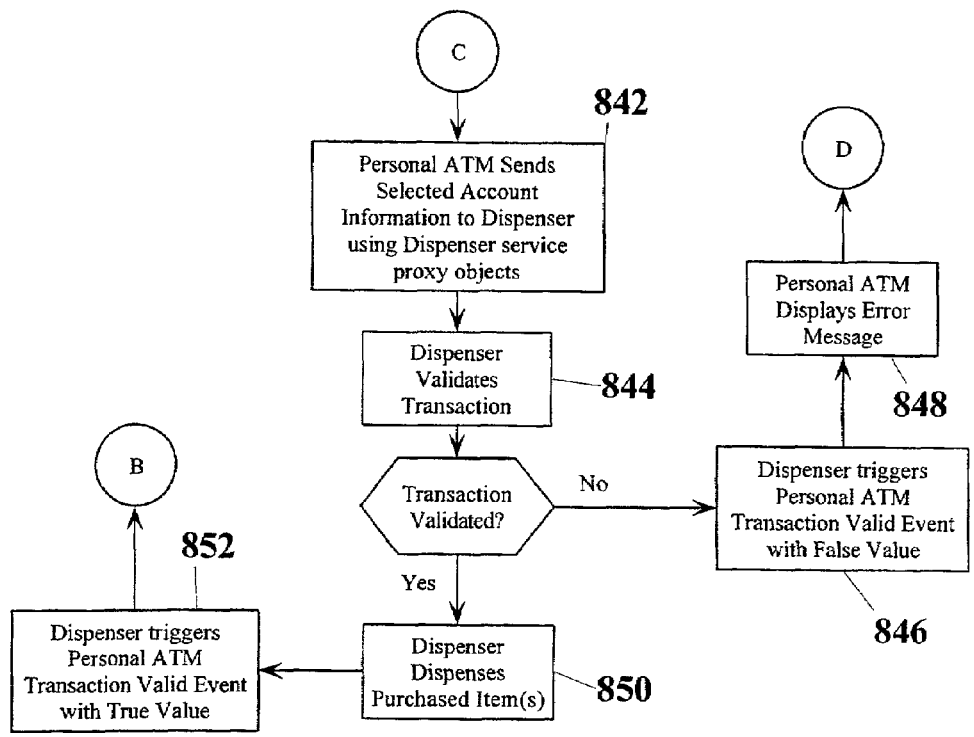

FIG. 25 is a continuation of the method steps for dispensing items from a host dispenser service as shown in FIG. 24. Here if the payment to the dispenser is confirmed by the user, the personal ATM in step 842 sends the selected account information to the host dispenser service using methods of the dispenser proxy. In step 844 if the host dispenser service does not validate the transaction, the host dispenser service is operative to trigger a validation event or method of the personal ATM with a false value in a step 846. Consequently the personal ATM in step 848 displays a corresponding error and jumps to step 832 of FIG. 24 for displaying the "payment from account" menu.

If the transaction is validated by the host dispenser service, the host dispenser service in step 850 dispenses the purchased item. In step 852 the dispenser triggers a validation event or method of the personal ATM with a true value. Consequently the personal ATM jumps to the steps for looking up Jini services and redisplaying the main menu.

Figure 26:
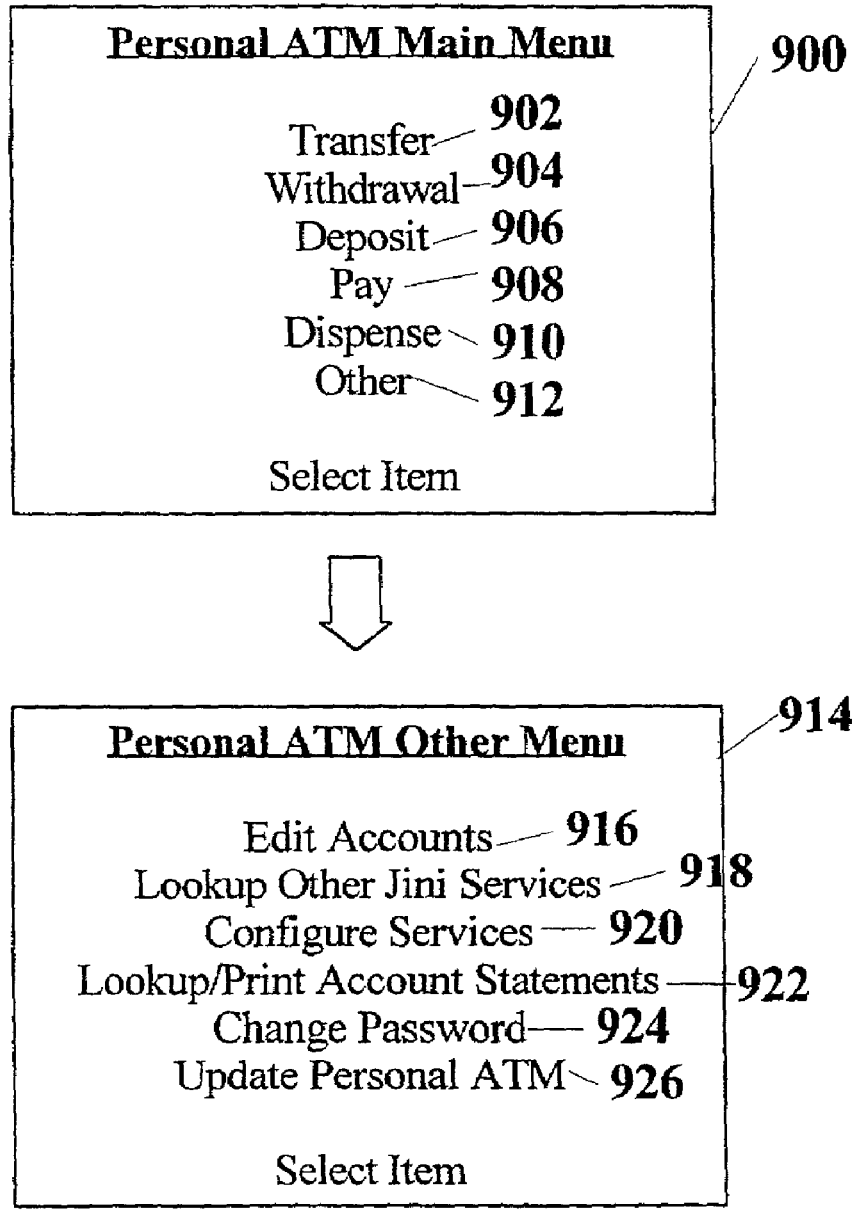
FIG. 26 schematically represents the initial personal ATM interface menus of the personal ATM.

FIG. 26 shows screens representative of the ATM interface menu of the personal ATM. A personal ATM main menu 900 in this exemplary embodiment includes menu items such as transfer 902, withdrawal 904, deposit 906, pay 908, dispense 910 and other 912. These items are visible responsive to the types of services that the personal ATM is in connection therewith. For example if the service is not in connection with a host ATM service that includes a cash dispenser service, the withdrawal menu item 902 will not be visible.

Selecting the "other" menu item 912 for this exemplary embodiment displays a second personal ATM "other" menu 914, which includes other features and maintenance options of the personal ATM. Such menu items include editing accounts 916, lookup of other Jini services 918, configure services 920, lookup/print account statements 922, change password 924, and update personal ATM 926. The editing accounts menu item 916 enables maintaining account information in the data store. The lookup other Jini services menu item 918 when selected initiates the Jini lookup of services on the network. The configure services menu item 920 when selected causes the display of further menus which enable the configuration of the services. The lookup/print account statements item 922 when selected enables the reviewing and printing of account statements. The change password menu item 924 enables the user to change the main personal ATM password. The update personal ATM menu item 926 enables the downloading of a new version of the personal ATM service and supporting software from the Internet or a host ATM.

Figure 27:
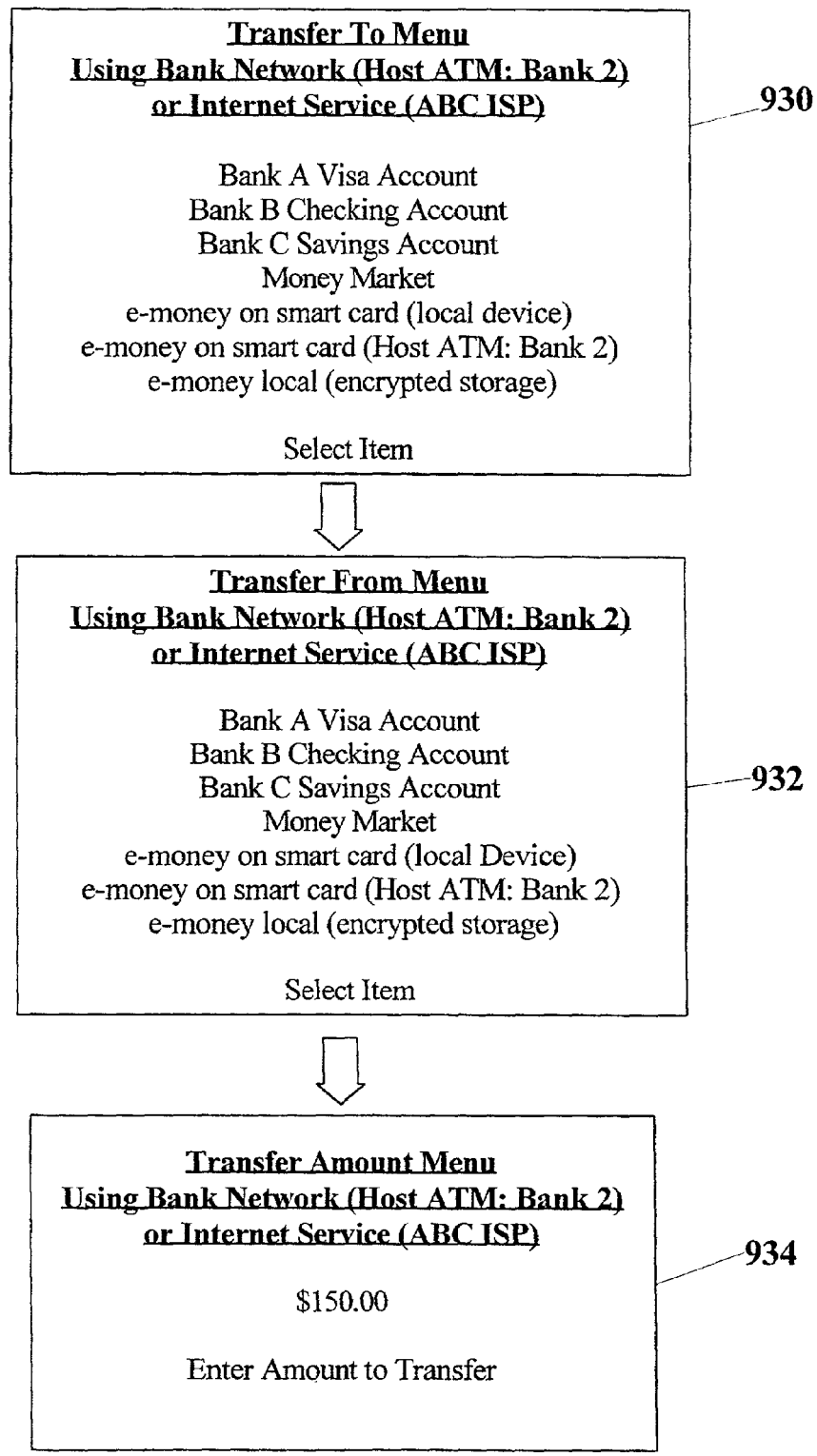
FIG. 27 schematically represents the personal ATM interface menus for transferring value between accounts with the personal ATM.

When the personal ATM is in operative connection with a host ATM or has access to an Internet based host banking system service, the personal ATM may be operated to transfer money between accounts. FIG. 27 is representative of exemplary transfer menus of the personal ATM. The "transfer to" menu 930 includes a list of accounts for which data is stored in the data store of the personal ATM. One of these accounts can be selected for transferring value to an account. After selecting a "transfer to" account, the personal ATM is operative to display a "transfer from" menu 932. This menu lists accounts for which data is stored in the data store from which value may be transferred. After selecting a "transfer from" account, the personal ATM prompts the user to enter the amount of value to transfer with a "transfer amount" menu 934. Once the user has selected the accounts and the amount of value to transfer, the personal ATM is operative to use the host banking system service at the host ATM or an Internet service to send transaction messages for transferring value between the selected accounts. If the transaction succeeds or if there are errors, the personal ATM is operative to display appropriate additional menus prompting the user for additional information and/or instructions related to continuing or aborting the transaction.

Figure 28:
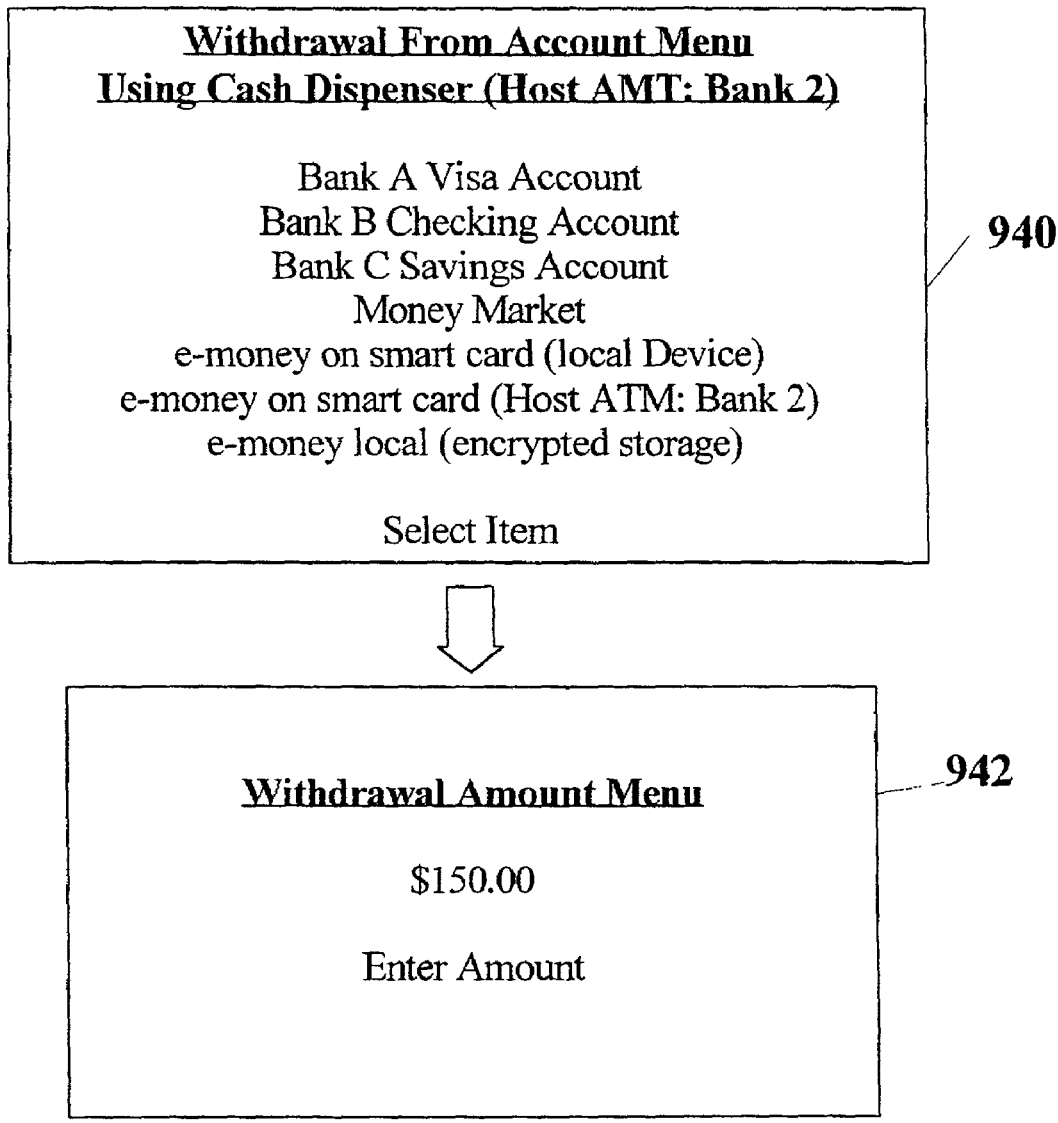
FIG. 28 schematically represents the personal ATM interface menus for withdrawing cash with the personal ATM.

FIG. 28 is representative of menu screens of the personal ATM for withdrawing cash. A personal ATM that is in operative connection with a host ATM with a cash dispenser is further operative to display a "withdrawal from account" menu 140 that lists a plurality of accounts stored in the data store of the personal ATM for withdrawing money. Once a user selects the account, the personal ATM prompts the user to enter the amount of cash to dispense with the "withdrawal amount" menu 942. After the account and amount information has been entered, the personal ATM is operative to use the cash dispenser proxy methods to initiate the dispensing of cash from the selected account. The cash dispenser service is operative to validate the transaction, to debit or charge the amount of money from the selected account and to dispense the cash to the user.

Figure 29:
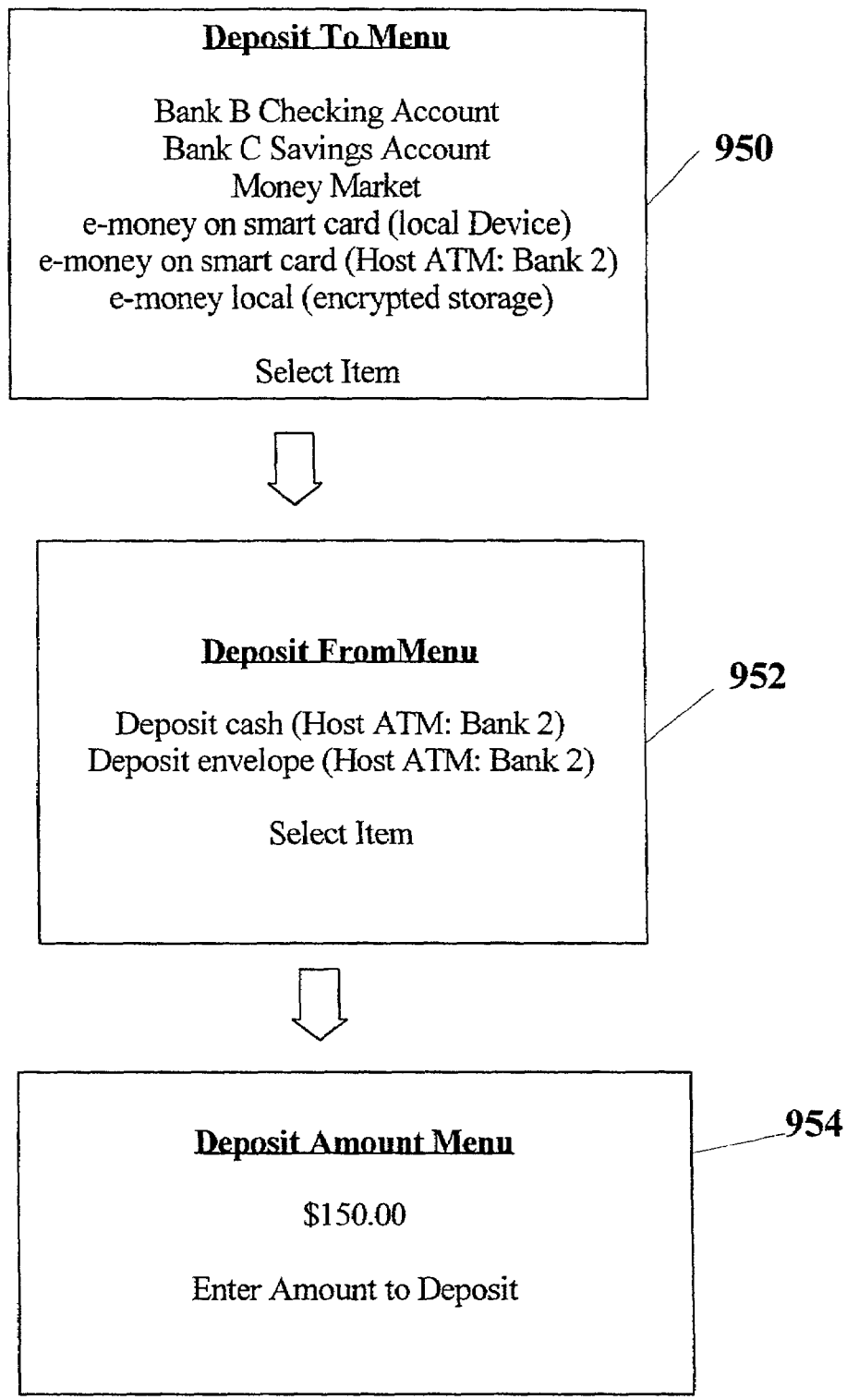
FIG. 29 schematically represents the personal ATM interface menus for making deposits with the personal ATM.

FIG. 29 is representative of personal ATM interface menus for depositing value. When a personal ATM is in operative connection with a host ATM that includes a cash recycler, envelope or other deposit accepting service, the personal ATM is operative to display a "deposit to" menu 950. This menu lists a plurality of accounts stored in the data store of the personal ATM to which money may be deposited. After the user selects an account, the personal ATM is operative to display a "deposit from" menu 952 that includes a list of available depository services associated with the host ATM. After selecting the type of service to use, the personal ATM displays a "deposit amount" menu 954 that prompts the user for the amount of the cash, the value of a check or value of other item(s) that is being deposited with the deposit services of the host ATM. After entering this information, the personal ATM is operative to have the selected deposit service acquire the cash, envelope or other deposit item from the user and to credit the selected account.

Figure 30:
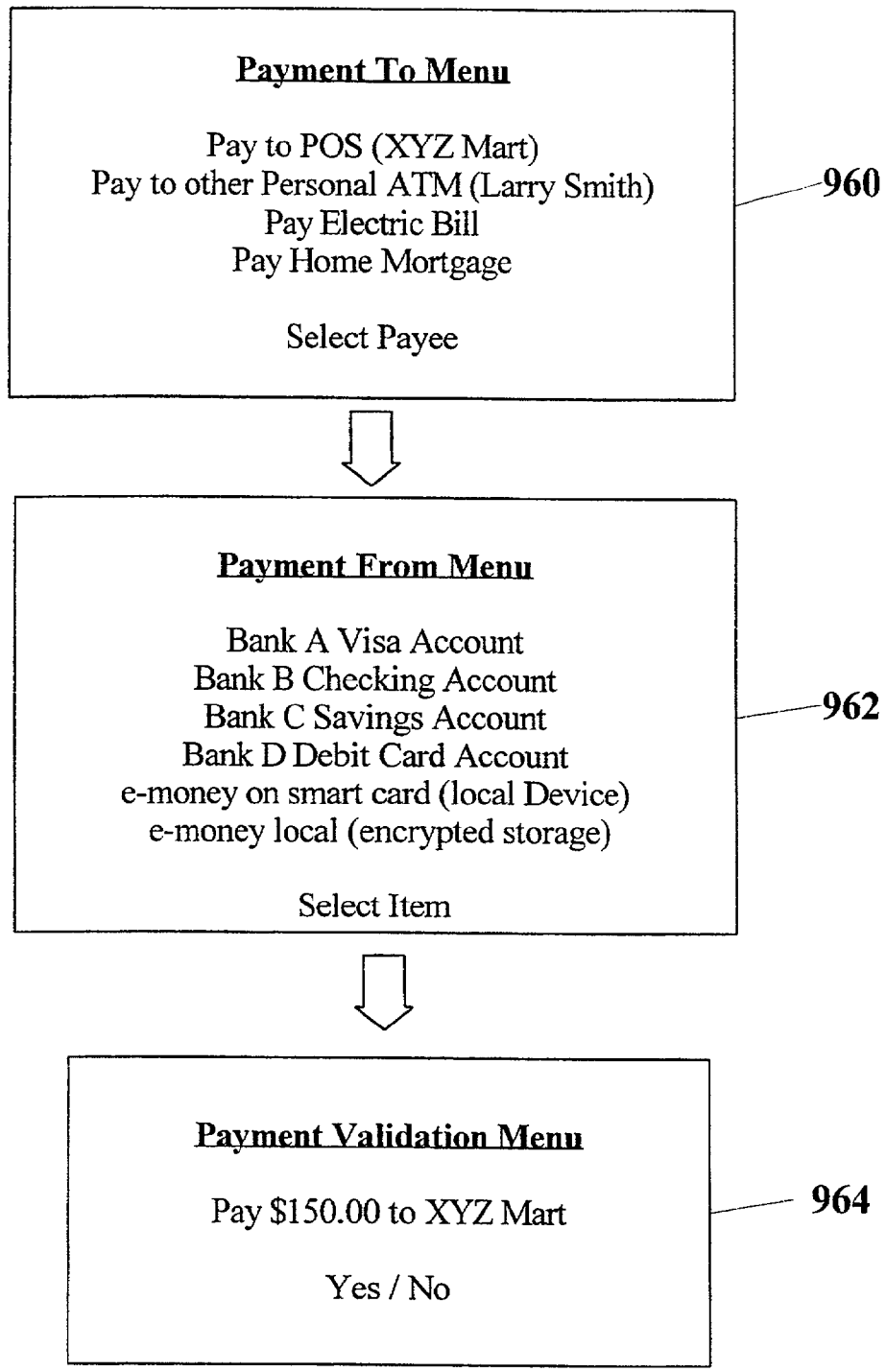
FIG. 30 schematically represents the personal ATM interface menus for making payments with the personal ATM.

FIG. 30 is representative of personal ATM menu screens for paying value. When a personal ATM is in operative connection with host POS service, the personal ATM is operative to display a "payment to" menu 960 with a list of all the POS services that the personal ATM has access to. The user is prompted to select a POS service with which to interface. After selecting a POS service or if there is only one POS service available, the personal ATM will only display the "payment from" menu 962, which prompts the user to select one of the accounts stored in the data store for paying for a purchase. After selecting the account, the personal ATM is operative to display a "payment validation" menu 964 with the amount of value that the POS service indicates is the payment amount. If the user confirms the payment, the personal ATM service is operative to invoke POS proxy methods to have the POS service initiate the payment from the selected account.

Figure 31:
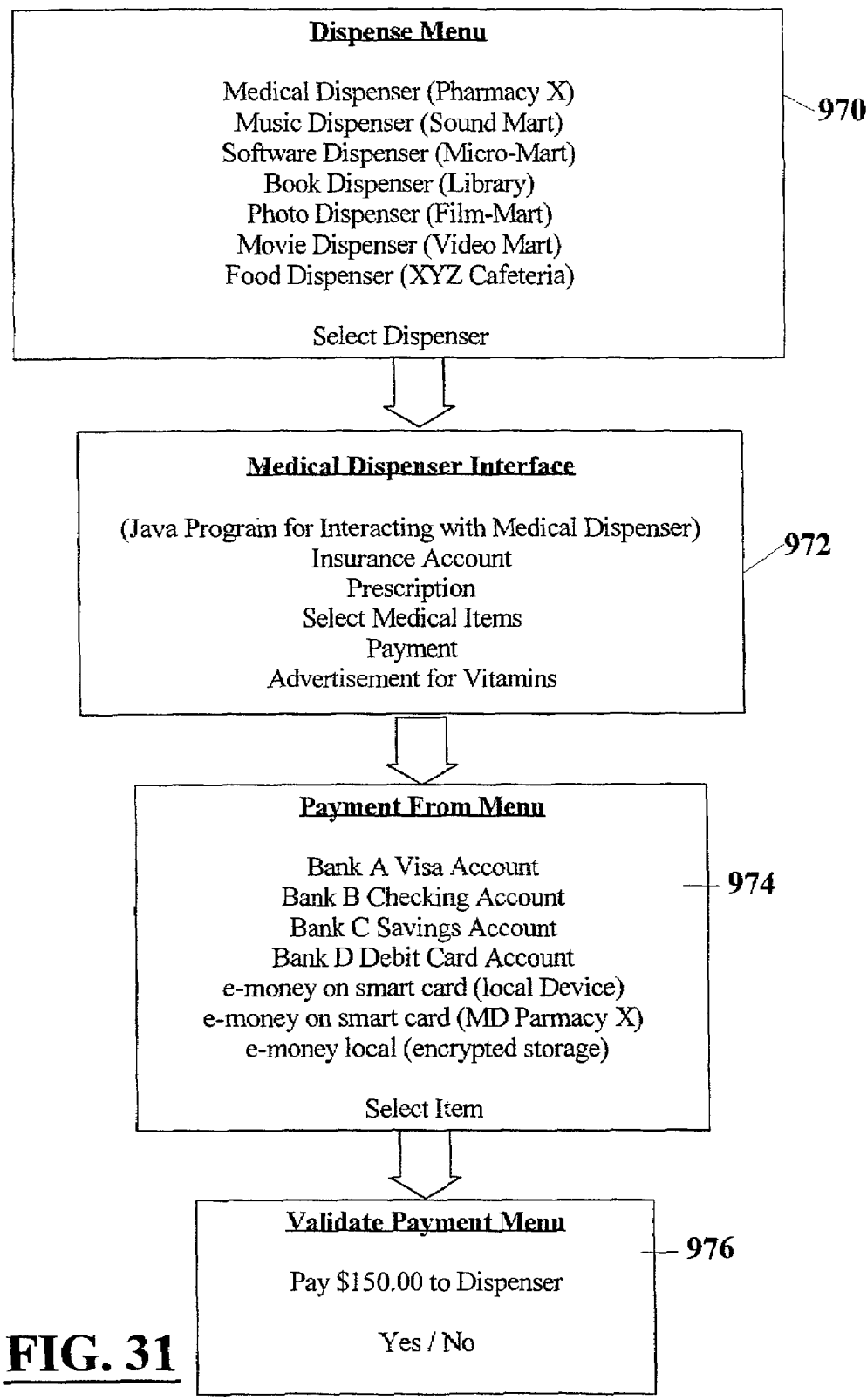
FIG. 31 schematically represents the personal ATM interface menus for dispensing items with the personal ATM.

FIG. 31 is representative of personal ATM menus for dispensing items. When the personal ATM is in operative connection with a host dispenser, the personal ATM is further operative to display a "dispense" menu 970 with a list of available dispensers. Upon a user selecting one of these, the personal ATM service is operative to use the proxy to the host dispenser to display a dispenser interface 972 for interacting with the dispenser service. If the personal ATM includes its own display service and input service, the dispenser interface is displayed in the display service of the personal ATM. If the personal ATM resides on a smart card, the dispenser interface is displayed on the display device of the host dispenser and interacts with the smart card service through a personal ATM proxy. Once a user has finished selecting items to dispense, the dispenser service is operative to have the personal ATM display a "payment from" menu 974 with a list of accounts stored in the data store of the personal ATM for payment to the dispenser. Upon selecting one of the accounts, the personal ATM is operative to display a "validate payment" menu 976 which requests the user to verify that the amount of money the dispenser requires is correct. If the user verifies the amount, the personal ATM is operative to invoke the dispense methods of the dispenser proxy to have the host dispenser debit the selected account and to dispense the selected item.

FIG. 32 is representative of the "edit account" menu 980 of the personal ATM. This menu includes a list of all the account information stored in the data store of the personal ATM. This account information includes the name of the account 982, the type of account 984, the password or pin number 986 of the account, the account number 988, the expiration date of the account 990, and the issuer ID or routing number 992 of the account.

In addition to storing information that corresponds to standard banking and credit type accounts, embodiments of the personal ATM may also include local storage for data that is representative of value. The local storage may include information that is representative of points for purchasing food from a cafeteria, food stamps, electronic money or any other data that corresponds to value. For example, electronic money may include encrypted units of value that are stored locally and transferred to other individuals without debiting or crediting an external account or line of credit.

The personal ATM of embodiments of the present invention offers the advantage of storing personal account information and stored value in one password protected and convenient location. Further, embodiments of the personal ATM may include their own interface application and uniform menus, so that a plurality of different types of transactions can be performed with the same familiar and easy to use personal interface. Services that do not exist locally are a simple and automatic connection away. Such connections to host services can be made by plugging the personal ATM into a universal network connection, or by a contact-less connection such as with an IR or RF interface.

Although previously described embodiments discuss the configuration and interaction between a plurality of services on a network, the present exemplary invention may also be applied to interactions between services that are performed off-line. For example, an alternative embodiment of the personal ATM could use a previously retrieved service proxy to prepare and simulate a series of transaction steps off-line prior to connecting to a host ATM. Such simulations may be performed with service proxies that are operative to behave as virtual services. A virtual service for a printer service for example, would respond programmatically just as an actual printer service, but without causing a hardware device to print on paper. Such simulated services in a personal ATM may be useful for testing complex transactions without actually transferring value.

As an example, a personal ATM may be able to access a service for performing complex transactions such as stock market purchases. Such a stock trader service may require value from an account of the personal ATM to be transferred to an account associated with the stock trader service. If the transaction is complex, such as a reallocation of many stocks, the user may choose to assemble and test the transaction off-line using the virtual service features of the service proxy associated with the stock trader service. As part of the process for setting up the trade, the stock trader service proxy may prompt the personal ATM service to have the user select one of the accounts associated with the personal ATM to use for transferring value during the trade. When the user wishes to perform the transaction on-line, the stock trader service proxy can re-run or commit the transaction with the service proxy in communication with stock trader service.

In other alternative embodiments of the present invention, services may be operative to perform transaction off-line as well. For example when a personal ATM is in communication with a service such as the previously described stock trader service, the user may invoke a transaction of the stock trader service that is conditioned on certain events occurring in the future. After the personal ATM has disconnected from the network that includes the stock trader service, the conditional transaction will still be executed if the stock trader service determines that the specified conditions are satisfied. Such conditions could include the purchase of a stock if the price falls to a desired level for example. In this manner a service can act as virtual agent which performs transactions for the user when the communication between the personal ATM and the services has been severed.

As discussed previously, the personal ATM may include a personal ATM service that can be accessed through a personal ATM proxy. In the previously described embodiments, methods of the personal ATM proxy are invoked by a host machine such as a host ATM to perform such actions as validating passwords and retrieving account information. However as a service, the personal ATM can be accessed by other applications as well, including applications that are resident on the same machine as the personal ATM. Such other applications may include accounting software, e-commerce applications, a web page for ordering items from an Internet merchant, or any other application that may require account information for performing transactions.

As a service, the personal ATM may include public methods which allow other applications and other services to access information managed by the personal ATM. Such public personal ATM methods may include methods for retrieving an account to transfer value from or method for retrieving an account to transfer to value to. When such methods are called, the personal ATM service is operative to send a list of accounts to the calling application or service. However, to keep personal account information secure, the public methods of the personal ATM may require a personal ATM password or other validating data as an argument. If personal ATM methods are invoked with a validating argument that is null or incorrect, the personal ATM service may be further operative to prompt the user to enter the password before transferring any information to an external application.

Any application that requires the transfer of value from an account may be configured to interface with the personal ATM using the previously described protocols for service to service communication. This enables the personal ATM to be used as a digital wallet for managing the transfer of value and for performing faster, more convenient, and more secure purchases with external services.

Thus the system and method for connecting services to an ATM of the present invention achieves at least one of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the structures shown herein or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. An automated transaction machine system comprising:
    an automated teller machine (ATM) including a transaction service,
    wherein the transaction service includes:
        a processor,
        a transaction device in operative connection with the processor, and
        a service proxy software component in operative connection with the processor,
    wherein the processor is operative to register with at least one other service in the ATM, wherein the processor is operative to cause a copy of the service proxy software component to be delivered to the at least one other service, and wherein the copy of the service proxy software component in the at least one other service is operative to cause at least one command to be communicated to the processor, wherein the processor is operative responsive to the command to cause the transaction device to perform a transaction function,
    a cell phone including an ATM service proxy software component,
        wherein the ATM service proxy software component is operative to output an ATM transaction menu on a display screen of the cell phone,
            wherein the menu includes indicia corresponding to the transaction function that the ATM is operative to perform,
    wherein the cell phone includes a data store,
        wherein the data store includes account information,
    wherein responsive to the ATM service proxy software component, the account information, and at least one cell phone user input corresponding to menu indicia, the cell phone is operative to cause the ATM to perform the transaction function.

2. The automated transaction machine system according to claim 1, wherein the service proxy software component is operative in a Java Virtual Machine (JVM) of the ATM.

3. The automated transaction machine system according to claim 1, wherein the processor is operative to register with the at least one other service responsive to the processor receiving a discovery announcement message from the at least one other service.

4. The automated transaction machine system according to claim 1, wherein the ATM comprises a lookup service, and wherein the processor is operative to cause the service proxy software component to register with the lookup service.

5. The automated transaction machine system according to claim 1 wherein the cell phone is operative to cause the ATM to dispense cash through operation of a cash dispenser.

6. The automated transaction machine system according to claim 1 wherein the cell phone is operative to cause the ATM to print at least one document through operation of a printer device.

7. A method comprising the steps of:
    (a) operatively connecting a personal automated transaction machine and a host system, wherein the personal automated transaction machine includes a cell phone, wherein the host system includes a cash dispenser device, wherein the personal automated transaction machine does not include the cash dispenser device;
    (b) receiving with the cell phone at least one transaction service proxy from the host system, wherein the transaction service proxy corresponds to a transaction service of the host system;
    (c) outputting a user interface menu through a display screen of the cell phone, wherein the user interface menu includes indicia corresponding to at least one selectable transaction function that the transaction service is operative to perform through operation of the host system, wherein a first selectable transaction function involves operation of the cash dispenser device;

(d) providing at least one input through an input device of the cell phone, wherein the at least one input corresponds to a selected transaction function;

(e) acquiring account information from a data store in the cell phone; and (f) performing the selected transaction function through operation of the host system responsive to the transaction service proxy, the at least one input, and the account information.

8. The method according to claim 7 and prior to step (d) further comprising the steps of:

(g) displaying a prompt for a user to enter a password;

(h) receiving an input that corresponds to a user entered password; and (i) validating that the user entered password corresponds to a password value stored in the data store.

9. The method according to claim 7 and further comprising the steps of:

(g) receiving with the cell phone an event notification message from the transaction service that includes a status indicative of the outcome of the performed transaction function; and (h) displaying event indicia through the display screen that corresponds to the event notification message.

10. The method according to claim 7, wherein in step (d) the selected transaction function includes dispensing cash, and wherein in step (f) the transaction service is operative to cause cash to be dispensed from the cash dispenser.

11. The method according to claim 7, wherein in step (d) the selected transaction function includes charging an account that corresponds to the account information for a purchase, and wherein in step (f) the transaction service is operative to cause the account to be charged for the purchase.

12. The method according to claim 7 wherein the host system includes a terminal including the cash dispenser, and wherein in step (d) the selected transaction function includes a dispense of cash and wherein in step (f) cash is dispensed by the cash dispenser.

13. The method according to claim 7 wherein the host system includes a terminal including a printing device, and wherein in step (d) the selected transaction function includes printing a document, and wherein in step (f) a document is printed by the printing device.

14. A method comprising the steps of:

(a) enabling communication between a portable personal automated transaction machine and a host terminal, wherein the host terminal includes a sheet dispenser, wherein the host terminal includes at least one transaction service, wherein the at least one transaction service includes a first transaction service, wherein the first transaction service includes operation of the sheet dispenser, wherein the portable personal automated transaction machine includes a cell phone, wherein the portable personal automated transaction machine does not include the sheet dispenser;

(b) sending to the cell phone, a transaction service proxy from the host terminal, wherein the transaction service proxy corresponds to at least the first transaction service;

(c) dispensing at least one sheet from the sheet dispenser responsive to operation of the transaction service proxy in the cell phone.

15. The method according to claim 14 wherein step (c) includes dispensing the at least one sheet responsive to user input to the cell phone.

16. The method according to claim 15 wherein the host terminal comprises an automated teller machine (ATM), wherein the sheet dispenser comprises a currency sheet dispenser, wherein step (c) includes dispensing at least one currency sheet from the currency sheet dispenser.

17. The method according to claim 15 wherein the host terminal comprises an automated teller machine (ATM), wherein the sheet dispenser comprises a receipt printer, wherein step (c) includes dispensing a transaction receipt.

* * * * *